(12) United States Patent
White et al.

(10) Patent No.: US 9,469,234 B2
(45) Date of Patent: *Oct. 18, 2016

(54) KEG BEVERAGE CONCESSION MODULE

(71) Applicant: 19th HOLE CART LLC, Scottsdale, AZ (US)

(72) Inventors: Michael White, Phoenix, AZ (US); John Sido, Phoenix, AZ (US); David Gronlund, Phoenix, AZ (US); Vijay Patibandla, Phoenix, AZ (US)

(73) Assignee: 19th HOLE CART LLC, Scottsdale, AZ (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/463,879

(22) Filed: Aug. 20, 2014

(65) Prior Publication Data

US 2014/0353998 A1   Dec. 4, 2014

Related U.S. Application Data

(63) Continuation-in-part of application No. 13/748,423, filed on Jan. 23, 2013, now Pat. No. 8,844,994.

(51) Int. Cl.
*B60P 3/025* (2006.01)

(52) U.S. Cl.
CPC ............. *B60P 3/0257* (2013.01); *Y10S 280/05* (2013.01)

(58) Field of Classification Search
CPC ........ B60R 9/00; B60R 11/00; B60P 3/0257; Y10S 280/05
USPC ............ 296/24.36, 24.35, 22, 24.45, 193.03, 296/37.1; 280/DIG. 5
See application file for complete search history.

(56) References Cited

U.S. PATENT DOCUMENTS

| | | | | |
|---|---|---|---|---|
| 4,225,059 A * | 9/1980 | Kappos | ..................... | B67D 1/04 222/146.6 |
| 6,203,087 B1 * | 3/2001 | Lance | ..................... | B60R 11/06 224/403 |
| 7,044,335 B2 * | 5/2006 | Aguirre | ................ | B67D 1/0406 222/129.1 |
| 7,418,311 B1 * | 8/2008 | Lagassey | ................ | G07F 9/026 221/150 R |
| D618,139 S  * | 6/2010 | Whitfield | ...................... | D12/101 |
| 2004/0256872 A1 * | 12/2004 | Piper | ..................... | B60P 3/0257 296/24.36 |
| 2009/0078724 A1 * | 3/2009 | Lamb | .................... | B60P 3/0257 222/608 |

* cited by examiner

*Primary Examiner* — Jason S Morrow
*Assistant Examiner* — E Turner Hicks
(74) *Attorney, Agent, or Firm* — Schmeiser, Olsen & Watts LLP

(57) ABSTRACT

Disclosed is a keg beverage concession module for use in a vending service unit with food and retail service features that couples to a utility vehicle. The keg beverage concession module includes a compartment for housing a keg of beer or wine, CO2 tank, cooler, cup storage, and dispensing system. Other vending service unit modules allow storage and sale of hot and cold food and beverages and other non-comestible goods, including tobacco products and golf items. The vending service unit includes removable concession modules facilitating quick and easy removal and interchangeability. The disclosed vending service unit includes drawers that allow different types of beverage to be stored and sold. The drawers are individually insulated and can be individually heated or chilled for different food temperatures and types. The vending service unit includes a counter surface that can be used to set items upon and upon which to conduct business.

17 Claims, 24 Drawing Sheets

KEG BEVERAGE CONCESSION MODULE

CROSS REFERENCE TO RELATED APPLICATION

This application is a continuation-in-part of U.S. patent application to 19$^{TH}$ Hole Cart LLC entitled "GOLF CART VENDING SERVICE UNIT," Ser. No. 13/748,423, filed Jan. 23, 2013, now pending, the disclosures of which are hereby incorporated entirely herein by reference.

BACKGROUND OF THE INVENTION

1. Technical Field

This invention relates to convertible beverage service modules for conveyances, including vehicles and other transports. In particular, this invention relates to a keg beverage concession module which is interchangeably installed within a mobile food and retail service unit for providing retail food and beverage services from a vehicle.

2. State of the Art

Golfing is a popular sport worldwide. A golfer typically spends several hours on the golf course for each golf outing. Accordingly, golfers have need for provision of food, beverages, and other supplies while they are on the golf course. Golfers are also willing to purchase retail items that they need for their golf game or that will make their outing more enjoyable. Each golf course has one or more clubhouse(s) where refreshments and supplies are sold, but the golfers usually have to leave the golf course to visit the clubhouse. Retail buildings can be strategically placed on the golf course, but this is expensive and upsets the flow and design of a golf course. Golfers do not want to leave the golf course to obtain refreshments and supplies and want a mobile unit that travels to them on the golf course to provide these items.

Golf is a social sport where golfers often interact with friends and business associates. For most participants, golf is a means of "active relaxation." Alcoholic beverages, including beer and wine, are popular among golfers. Beer and wine are supplied in bulk form within kegs; also, beer and white wine are generally served chilled.

Accordingly, what is needed is a mobile retail facility, such as a utility vehicle with retail service features including a means for bulk transport and serving of chilled beverages.

DISCLOSURE OF EMBODIMENTS OF THE INVENTION

This invention relates to a vending service unit and in particular to a vending service unit that attaches to a utility vehicle, wherein the vending service unit contains a keg beverage concession module for dispensing keg-stored beverages from the utility vehicle vending service unit.

Disclosed is a mobile vending service unit with food and retail service features, including a keg beverage concession module. The mobile food and retail service unit according to embodiments of the invention includes a conveyance; and a vending service unit coupled to the conveyance, the vending service unit comprising a vending service unit body; a removable concession module; and a pressure bar retaining system, wherein the removable concession module is coupled to the vending service unit body by the pressure bar retaining system.

The vending service unit couples to the conveyance. The vending service unit comprises a drawer that couples to a vending service unit body; and a keg beverage concession module that couples to the vending service unit body. In some embodiments the vending service unit further comprises a counter coupled to the vending service unit body above the drawer. In some embodiments the drawer is four drawers each coupled to the vending service unit body beneath the counter, and wherein more than one of the four drawers can be opened at a time. In some embodiments only one of the four drawers can be opened at a time. In some embodiments the vending service unit includes a removable concession module, wherein the removable concession module may be removeably coupled to the vending service unit body. In some embodiments the vending service unit includes a module locking bar, wherein the module locking bar removeably couples the removable concession module to the vending service unit body.

In some embodiments the counter comprises a first removable counter portion. In some embodiments a removable concession module that is coupled to the vending service unit body is prevented from being removed from the vending service unit body in response to the first removable counter portion being coupled to the vending service unit body. In some embodiments the vending service unit body includes a drawer opening, where the drawer opening receives the drawer, and where an engine of the utility vehicle is accessible through the drawer opening in response to the drawer being removed from the drawer opening. In some embodiments the vending service unit body includes a water drain channel. In some embodiments the drawer includes a rear overflow drain, where the water drain channel receives water that is released from the rear overflow drain.

Disclosed is a vending service unit that couples to a utility vehicle. The vending service unit according to embodiments of the invention includes a vending service unit body. In some embodiments the vending service unit body includes a lower concession portion, where the lower concession portion includes a lower concession portion top surface. In some embodiments the vending service unit body includes an upper concession portion, where the upper concession portion is coupled to the lower concession portion top surface. In some embodiments the vending service unit body includes a counter coupled to the lower concession portion top surface. In some embodiments the vending service unit body includes a plurality of drawers, wherein each drawer opens from beneath the counter, and wherein each drawer is removeably coupled to the lower concession portion.

In some embodiments the upper concession portion includes a removable concession module. In some embodiments, the removable concession module is a keg beverage concession module. In some embodiments the upper concession portion includes an upper convertible beverage service module, a removable module mounting frame, a first module locking bar coupled to the removable module mounting frame, and a second module locking bar coupled to the removable module mounting frame. The first and the second module locking bars couple the removable concession module to the vending service unit body. In some embodiments, the module locking bar frictionally couples the concession module to the vending service unit body. In some embodiments, the lower concession portion top surface contains a recess and the removable concession module contains a protrusion, wherein the protrusion engages the recess when the removable concession portion is installed into the vending service unit. In some embodiments, the plurality of drawers is thermally insulated. In some embodiments the plurality of drawers comprises a refrigeration unit.

In some embodiments the plurality of drawers comprises a heating unit. In some embodiments the vending service unit includes a power source.

In some embodiments the lower concession portion includes a drawer slide coupled to the lower concession portion, and a slotted bar coupled to the lower concession portion. One of the plurality of drawers is operationally coupled to the drawer slide. The one of the plurality of drawers includes a drawer lock lever coupled to the one of the plurality of drawers, where the drawer lock lever rotates between a locked and an unlocked position. The one of the plurality of drawers also includes a drawer lock tab coupled to the drawer lock lever. The drawer lock tab extends into one of the plurality of slots in response to the drawer lock lever being in the locked position.

Disclosed is a method of coupling a vending service unit to a utility vehicle. The method of coupling a vending service unit to a utility vehicle according to the invention includes the steps of coupling a vending service unit body to the utility vehicle, coupling a counter to the vending service unit body, and coupling a drawer to the vending service unit body. In some embodiments the method of coupling a vending service unit to a utility vehicle according to the invention includes the step of removeably coupling a removable concession module to the vending service unit body. In some embodiments the step of removeably coupling a removable concession module to the vending service unit body includes the steps of placing a removable concession module on the vending service unit body, lowering a module locking bar against a top surface of the removable concession module, and locking the module locking bar in the lowered position, wherein the removable concession module is prevented from being removed from the vending service unit body in response to the module locking bar being locked in the lowered position. In some embodiments the method of coupling a vending service unit to a utility vehicle according to the invention includes the step of electrically coupling an upper concession module to a power source, wherein the power source does not supply power to the utility vehicle. In some embodiments the method of coupling a vending service unit to a utility vehicle according to the invention includes the step of electrically coupling an upper concession module to a power source, where the power source does not obtain power from the utility vehicle. In some embodiments the method of coupling a vending service unit to a utility vehicle or other vehicle according to the invention includes the step of electrically coupling an upper concession module to a power source, wherein the power source does obtain power from the utility vehicle. In some embodiments the method of coupling a vending service unit to a utility vehicle according to the invention includes the step of running a wiring harness through the vending service unit body. In some embodiments the method of coupling a vending service unit to a utility vehicle according to the invention includes the step of electrically coupling the drawer to the wiring harness.

In some embodiments, the keg beverage concession module comprises a ceiling; a floor; a first wall; a second wall; a server side, the server side comprising a tap compartment and a storage compartment; a supply side, wherein the supply side is opposite the server side, the supply side comprising a keg storage compartment and a cooling compartment; a server side door; and a supply side door operatively coupled to the respective compartments. In some embodiments, the keg beverage concession module further comprises a keg mounting bracket and a cylinder mounting bracket.

In some embodiments, the tap compartment further comprises a fascia wherein the fascia extends upward from the floor; a fascia opening; and a tap spigot, wherein the tap spigot is coupled to the fascia opening. In some embodiments, the tap compartment further comprises a drip tray, wherein the drip tray engages the floor. In some embodiments, the tap compartment further comprises a first partition, wherein the partition extends upward from the floor perpendicular to the server side door, and wherein the tap compartment is bounded by the fascia, the floor, the first wall, the server side door, and the partition; and a first shelf, wherein the first shelf is coupled between the partition and the first wall and extends between the supply side and the server side. The first partition acts to functionally and hygenically isolate retail and other items stored in the storage compartment from beverages dispensed from the tap compartment. In some embodiments, the first shelf further comprises a first end at the server side; and a second end at the supply side, wherein the first end is inclined below the second end such that gravity acts to move a removable object resting on the first shelf toward the first end.

In some embodiments, the cooling compartment further comprises a second partition, wherein the second partition extends upward from the floor and separates the cooling compartment from the keg storage compartment; an ice bin; a beverage cooling coil, wherein the beverage cooling coil is housed within the ice bin; and a bin lid, wherein the bin lid engages the ice bin. The second partition functionally isolates the cooling compartment from the keg storage compartment. In some embodiments, the cooling compartment further comprises a melt water collection system comprising a shutoff valve; and a drain hose comprising a proximal end coupled to the ice bin and a distal end coupled to the shutoff valve. In some embodiments, the server side door and the supply side door of the keg beverage concession module further comprise a lock.

In some embodiments, the storage compartment further comprises a second shelf.

In some embodiments, the vending service unit further comprises a module locking bar, wherein the module locking bar couples each of the concession modules to the vending service unit body, and wherein the vending service unit couples to the utility vehicle.

Disclosed is a keg beverage concession module, comprising a server side; the server side comprising a tap compartment and a storage compartment; a supply side, wherein the supply side is opposite the server side, the supply side comprising a keg storage compartment and a cooling compartment; a server side door; and a supply side door. In some embodiments, the keg storage compartment further comprises a keg mounting bracket. In some embodiments, the keg storage compartment further comprises a compressed gas cylinder mounting bracket.

In some embodiments, the tap compartment further comprises a floor; a ceiling; a first wall; a fascia, wherein the fascia extends upward from the floor perpendicular to the first wall; a fascia opening; a tap spigot, wherein the tap spigot is coupled to the fascia opening; a drip tray, wherein the drip tray removably couples to the base; and a first shelf, wherein the first shelf engages the first partition and traverses between the supply side and the server side, and wherein the first shelf further comprises a first end at the server side and a second end at the supply side, wherein the first end inclines below the second end such that gravity acts to facilitate the movement of a removable object resting on the first shelf toward the first end.

In some embodiments, the cooling compartment further comprises an ice bin and a beverage cooling coil, wherein the beverage cooling coil is housed within the ice bin; and an ice bin lid engages the ice bin.

In some embodiments, the supply side further comprises a meltwater collection system comprising a shutoff valve and a drain hose, the drain hose comprising a proximal end coupled to the ice bin, and a distal end coupled to the shutoff valve. In some embodiments, any one or more of the fascia, the server side door, the counter, the supply side door, or other structures further comprise a surface configured for display of advertising information.

Disclosed is a mobile vending service unit comprising a conveyance; and a vending service unit coupled to the conveyance, the vending service unit comprising a vending service unit body; and a removable concession module coupled to the vending service unit body. In some embodiments the mobile vending service unit further comprises a first surface with a recess; and a second surface with a protrusion, wherein the protrusion engages the recess when the removable concession module is coupled to the vending service unit body.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
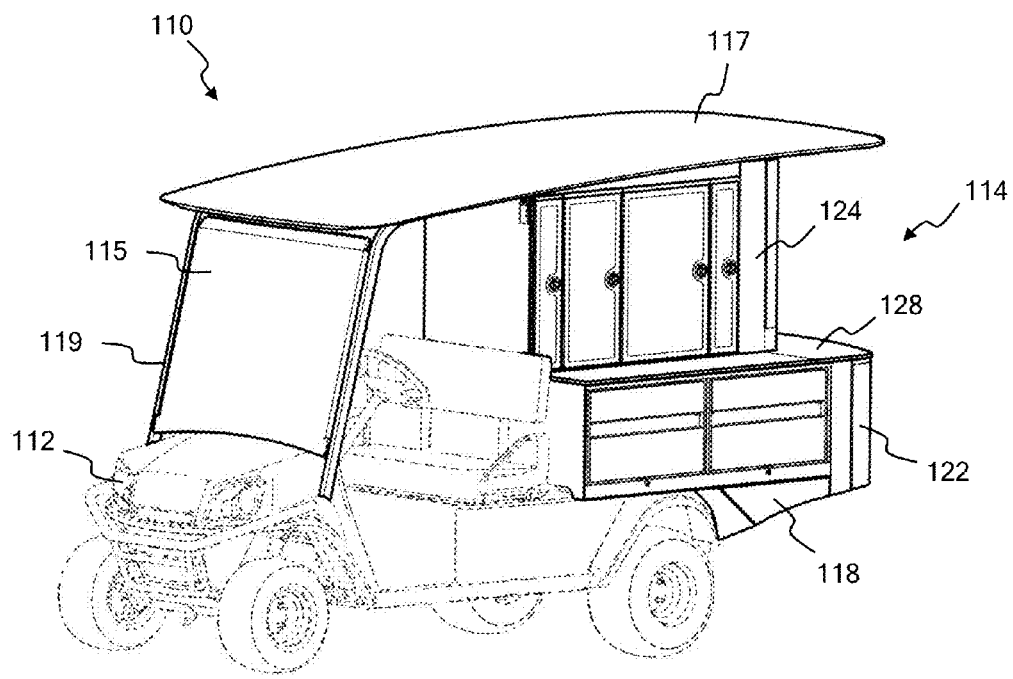
FIG. 1 is a front perspective view of an embodiment of utility vehicle with food and retail service features 110 according to the invention, where utility vehicle with food and retail service features 110 includes one embodiment of vending service unit 114, according to the invention.

As discussed above, the disclosed invention relates to a keg beverage concession module for a mobile vending service unit. The vending service unit attaches to a conveyance, such as a utility vehicle for example, for provision of food, beverages, and other retail service features from the conveyance.

Disclosed is a keg beverage concession module. The module is completely self-contained, without the need for external plumbing, electrical, or other connections. As such, the keg beverage concession module may be used alone or in a larger vending service unit. In some embodiments where the keg beverage concession module is used in a larger vending service unit, the module is held in place by various combinations of a locking bar/recess/protrusion retainer system described below. Disclosed herein are embodiments of the invention installed in a vending service unit coupled to a utility vehicle, however this is not meant to be limiting. The keg beverage concession module may be used in any compatible vending service unit installed on any conveyance, such as an aircraft, watercraft, or railway train, for example. The keg beverage concession module may also be used in a wheeled portable or other service unit propelled by hand, such as a cart used in a commercial or residential facility, including hotels, inns, and resorts, assisted living communities, and others.

Depending on the model, in addition to the keg beverage concession module the vending service unit housing may include additional modules that allow hot and cold food and beverages to be stored and sold, and other retail items such as tobacco, golf supplies, and ice. Like the keg beverage concession module, other vending service unit modules are removable concession modules that the vendor can easily and quickly replace and/or interchange, allowing the vending service unit to be reconfigurable and to offer a variety of different types of comestibles and other supplies.

The disclosed keg beverage concession module is a removable, interchangeable concession module that provides for the sale of beverages dispensed from kegs, most commonly beer and wine, to golfers on the golf course for example, or otherwise away from fixed vending services, such as a clubhouse bar. The disclosed module operates as a completely self-contained unit. It is divided into a server side and a supply side, situated in a "back-to-back" configuration. The server side is seen by the consumer and is the location from which the product beverage and supplies, such as disposable cups for example, are dispensed. The supply side is generally hidden from the consumer, but provides access for the vendor to replace kegs, compressed gas cylinders, and ice for the cooling mechanism. The supply side also provides access for cleaning and servicing of the product delivery hardware and cooling mechanisms. The server side is further divided into a tap compartment and a storage compartment. The supply side is similarly further divided into a keg storage compartment and a cooling compartment.

Golfing is a popular sport worldwide. A golfer typically spends several hours on the golf course for each golf outing. Accordingly, golfers have need for provision of food, beverages, and other supplies while they are on the golf course. Golfers are also willing to purchase retail items that they need for their golf game or that will make their outing more enjoyable. Each golf course has one or more clubhouse(s) where refreshments and supplies are sold, but the golfers usually have to leave the golf course to visit the clubhouse. Retail buildings can be strategically placed on the golf course, but this is expensive and upsets the flow and design of a golf course. Golfers do not want to leave the golf course to obtain refreshments and supplies and want a mobile unit that travels to them on the golf course to provide these items.

Golf is a social sport where golfers often interact with friends and business associates. For most participants, golf is a means of outdoor "active relaxation." Alcoholic beverages, including beer and wine, are often enjoyed while relaxing and are popular among golfers. Beer and wine are supplied in bulk form within kegs; also, beer and white wine are generally served chilled.

Units have been previously available that provide vending capabilities to utility vehicles and similar vehicles, but they have many drawbacks and limitations. The food storage areas are not compartmentalized, therefore food and drinks tend to get mixed up and are hard to access. There is no dedicated area for consumable ice, so the vendor usually ends up having to carry an extra ice chest somewhere else for consumable ice. The compartments are not reconfigurable or easily removable. The whole vending unit needs to be removed to access or service the utility vehicle. And, the vending units do not have their own power source. Other portable vending units carrying ice drain melt water from the comestible or non-comestible ice onto the ground. There is a need for a reconfigurable vending unit specifically designed for a conveyance, including but not limited to utility vehicles and other small off-road vehicles for example, that is able to provide mobile vending services, including chilled beverages such as beer and wine, from kegs contained in the units.

Figure 2:
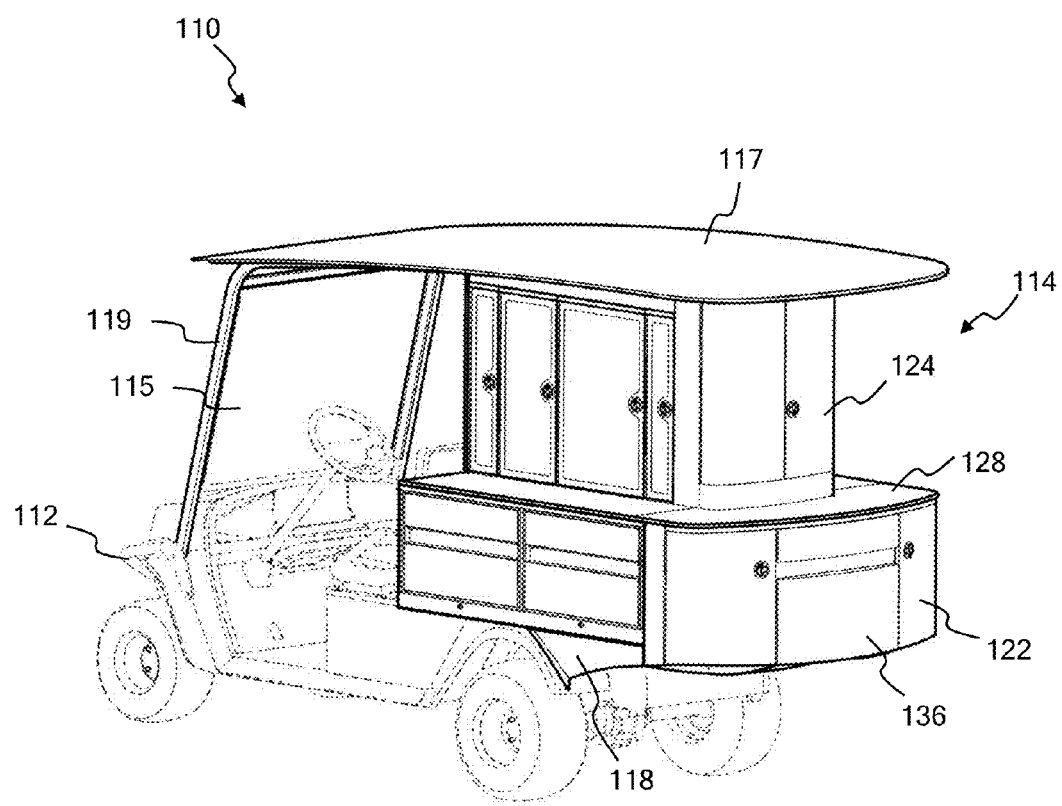
FIG. 2 is a rear perspective view of utility vehicle with food and retail service features 110 of FIG. 1.
Figure 3:
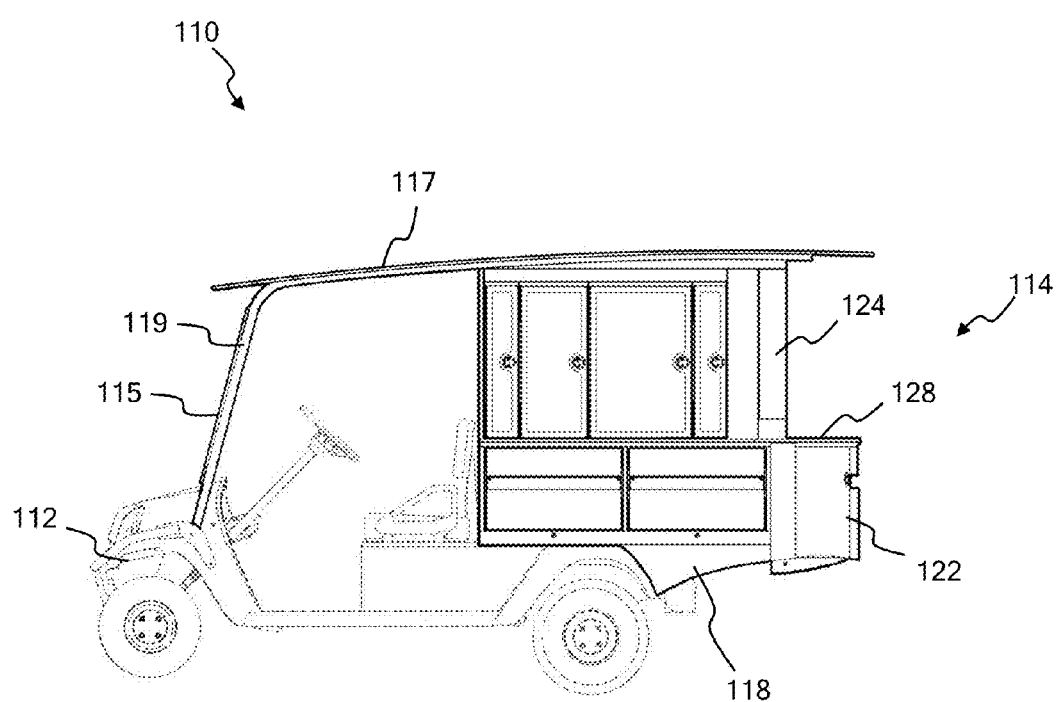
FIG. 3 is a side view of the utility vehicle with food and retail service features 110 of FIG. 1.
Figure 4:
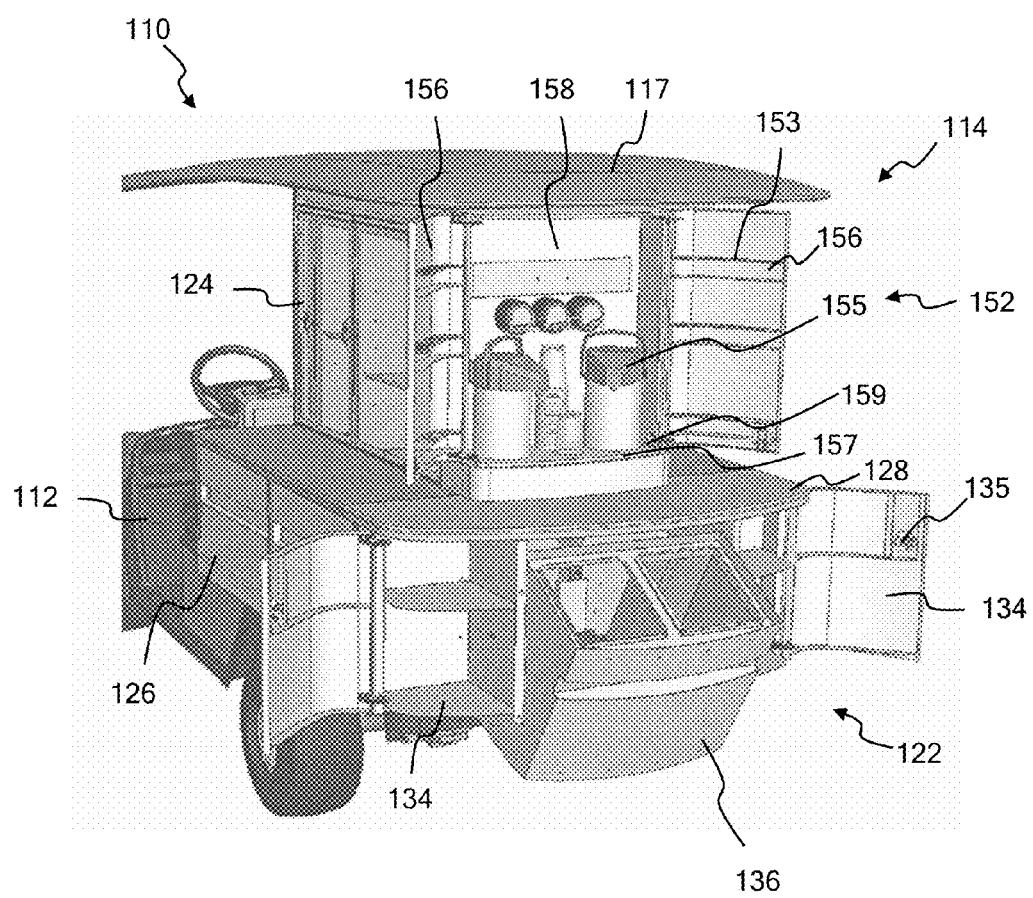
FIG. 4 is a rear perspective view of the vending service unit 114 according to the invention of FIG. 1.

FIG. 1 through FIG. 4 show a utility vehicle with food and retail service features 110 according to the invention. FIG. 1 shows a front perspective view of an embodiment of utility vehicle 110 according to the invention. FIG. 2 shows a rear perspective view of utility vehicle 110 according to the invention. FIG. 3 shows a side view of utility vehicle 110 according to the invention. FIG. 4 shows a rear perspective view of utility vehicle with food and retail service features 110 of FIG. 1, with several of the retail service compartments and modules open. Utility vehicle with food and retail service features 110 (also called vending utility vehicle 110 utility vehicle 110) according to the invention includes utility vehicle 112 and vending service unit 114 according to the invention. Vending service unit 114 according to the invention is shown in one embodiment in the figures. Utility vehicle 112 is an example of the type of utility vehicle 112 that vending service unit 114 can be coupled to. Utility vehicle 112 is shown in dotted lines in some figures to indicate that utility vehicle 112 can be any type of utility vehicle, not just the example type shown in the figures. Utility vehicle 112 becomes utility vehicle with food and retail vending services 110 according to the invention once vending service unit 114 according to the invention is coupled to utility vehicle 112. Vending service unit 114 couples to utility vehicle 112 to transform utility vehicle 112 into a mobile vending and services vehicle. Vending service unit 114 gives utility vehicle 112 the capability for mobile food, beverage, and other vending services. Vending service unit 114 includes units and modules designed to allow efficient and easy vending of different types of food and beverages, including reconfigurable hot and cold modules, and space to store and vend non-food items.

Vending service unit 114 includes upper concession portion 124 and lower concession portion 122. Lower concession portion 122 includes lower concession portion top surface 170 and lower concession portion bottom surface 172 (FIG. 6, FIG. 8, FIG. 9, and FIG. 10). Lower concession portion bottom surface 172 is coupled to utility vehicle 112 by any suitable means. Upper concession portion 124 sets on top of and couples to lower concession portion top surface 170, surrounded by counter 128. Counter 128 provides a convenient flat and substantially horizontal surface for transacting business, setting items on, or using as an eating surface.

Figure 9:
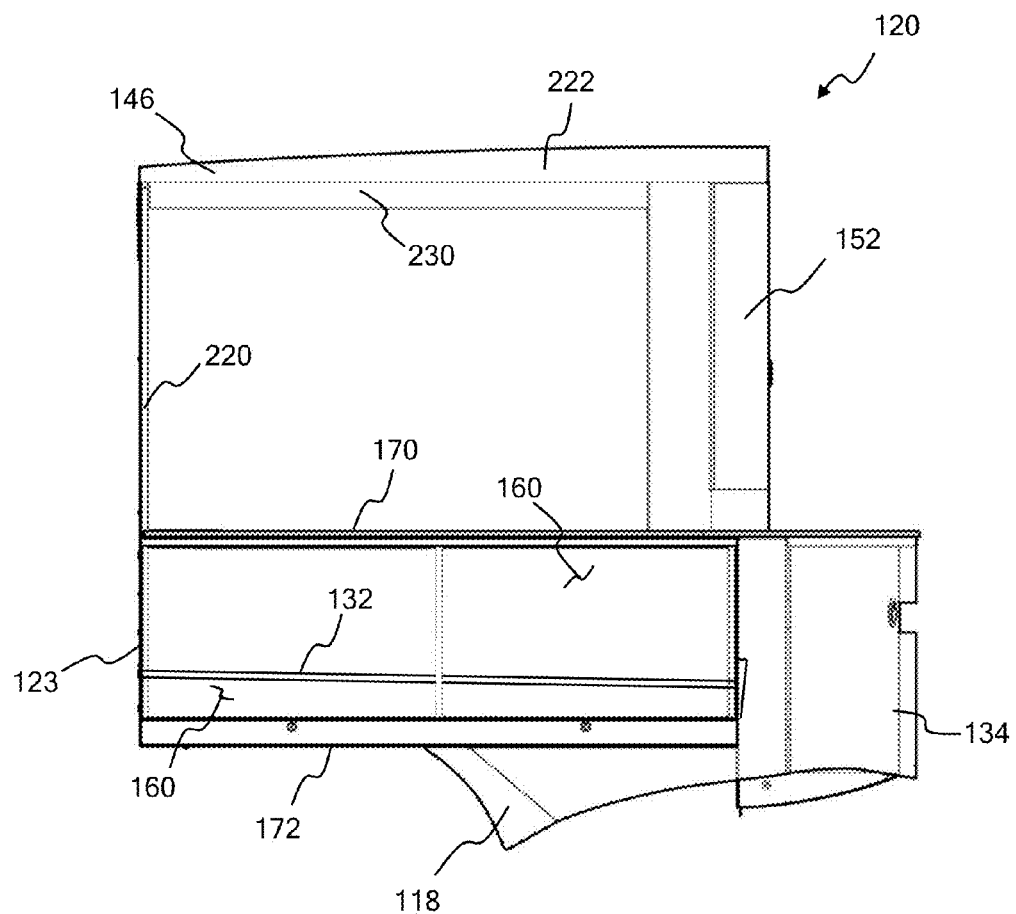
FIG. 9 is a side view of an embodiment of vending service unit body 120 according to the invention.

The keg beverage concession module 500 is one example of a removable concession module 140, which inserts into upper concession portion 124. In the embodiment shown, upper concession portion 124 includes one fixed concession module—convertible beverage service module 152—at the rear of upper concession portion 124. Convertible beverage service module 152 is a part of vending service unit body 120 (FIG. 9). In the embodiment shown, upper concession portion 124 includes four removable concession modules 140. Removable concession module 140 can be repeatably coupled to and removed from vending service unit body 120, as will be discussed in more detail below. The keg beverage concession module 500 and other removable concession modules 140 can be interchanged with modules of other sizes and configurations to provide the ability for the vendor to customize vending service unit 114, as well as modify vending service unit 114 to different events, times of day, or particular customers. The keg beverage concession module 500 is coupled to vending service unit body 120 using a module locking bar 142 and counter 128, as will be discussed in more detail below.

Figure 5:
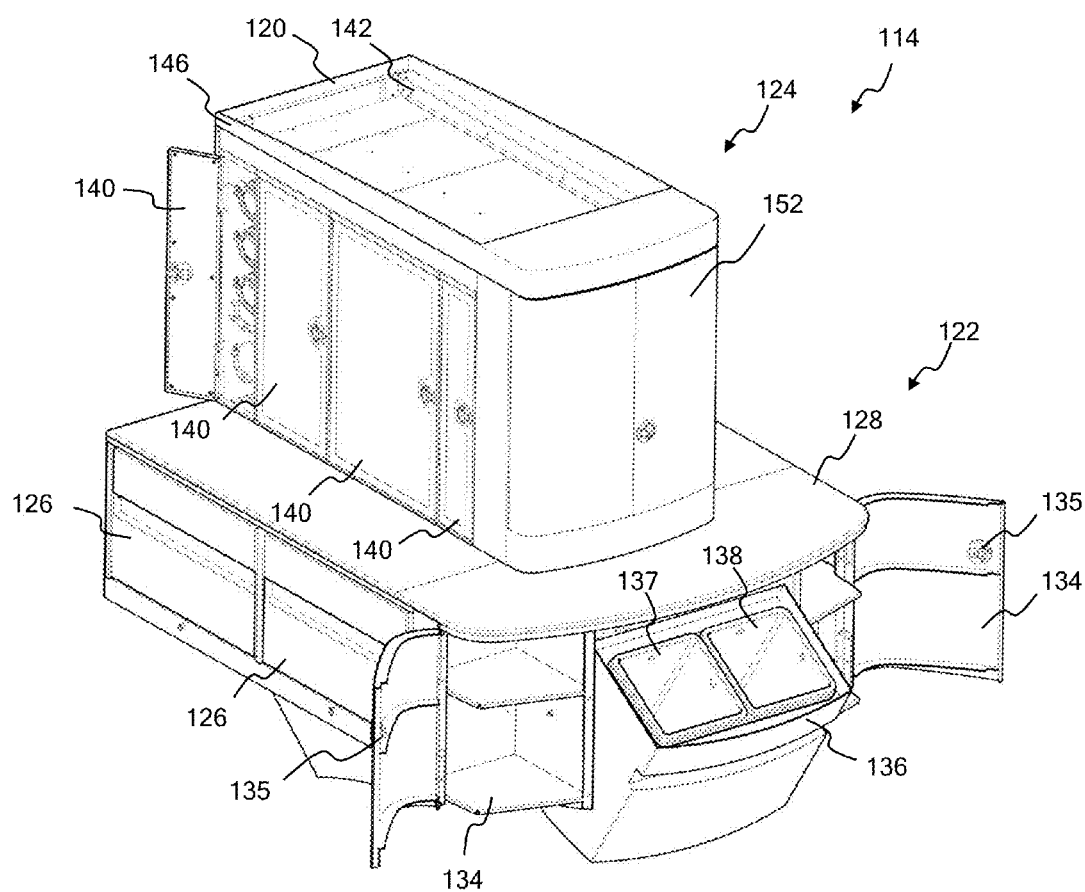
FIG. 5 is a rear perspective view of the vending service unit 114 according to the invention of FIG. 1.
Figure 6:
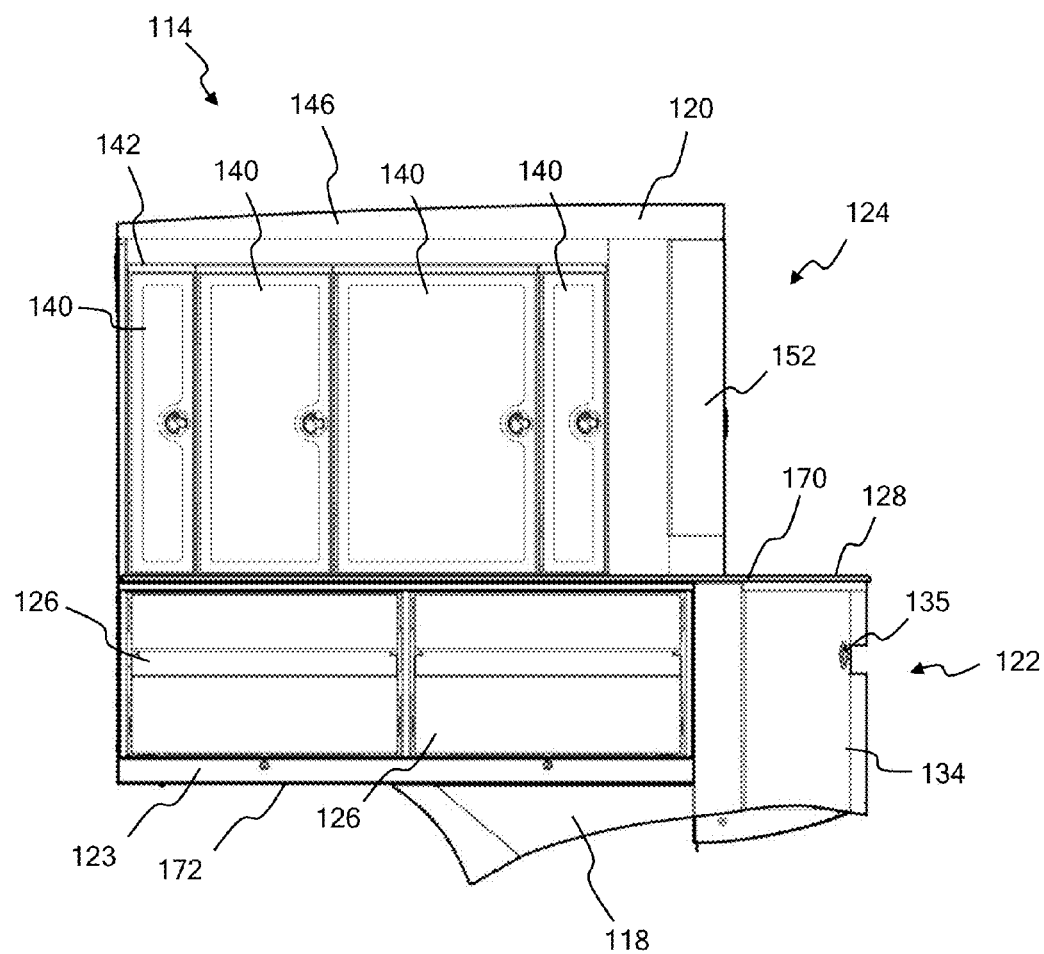
FIG. 6 is a side view of the vending service unit 114 of FIG. 1

Vending service unit 114, according to embodiments of the invention, includes vending service unit body 120 as shown in one embodiment in FIG. 9. FIG. 9 is a side view of vending service unit body 120 of vending service unit 114 of FIG. 5. Vending service unit body 120 is the basic structure that is coupled to utility vehicle 112. Vending service unit body 120 does not include the removable and interchangeable modules such as drawers 126, removable concession modules 140, or keg beverage concession module 500.

Vending service unit body 120 includes lower concession portion frame 123. Lower concession portion frame 123 includes lower concession portion top surface 170, lower concession portion bottom surface 172, and storage compartments 134. Vending service unit body 120 also includes water drain channel 132 which collects and drains excess water from drawers 126.

Vending service unit body 120 includes openings 160 for drawers 126. Drawers 126 are removable from vending service unit body 120. This is useful for servicing utility vehicle 112. The engine and other mechanical components of utility vehicle 112 are accessible and can be serviced through drawer openings 160 when one or more drawers 126 are removed. This makes utility vehicle 112 easily serviced without having to remove vending service unit 114. In the past, vending boxes for vehicles would need to be removed from the vehicle to perform service on the vehicle.

Vending service unit body 120 in this embodiment also includes removable module mounting frame 146, and upper convertible beverage service module 152 of upper concession portion 124, as shown in FIG. 9 through FIG. 14.

Figure 10:
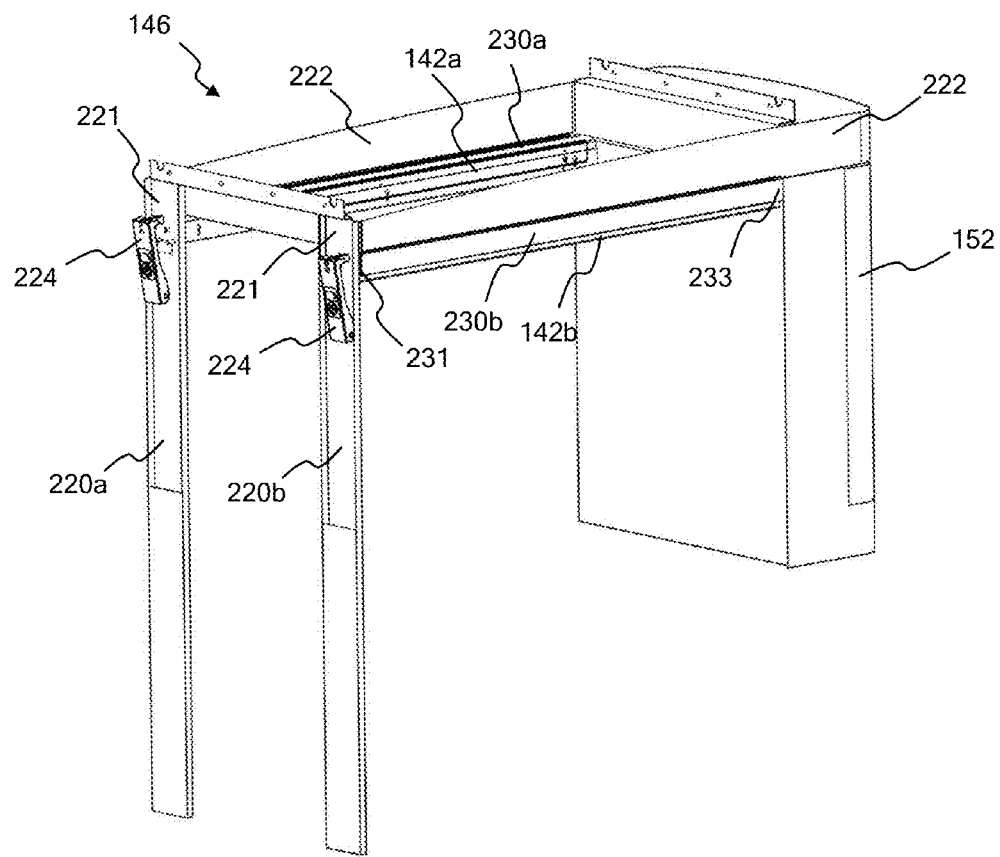
FIG. 10 is a front perspective view of an embodiment of upper concession portion 124 according to the invention, including first module locking bar 142a and second module locking bar 142b.
Figure 13:
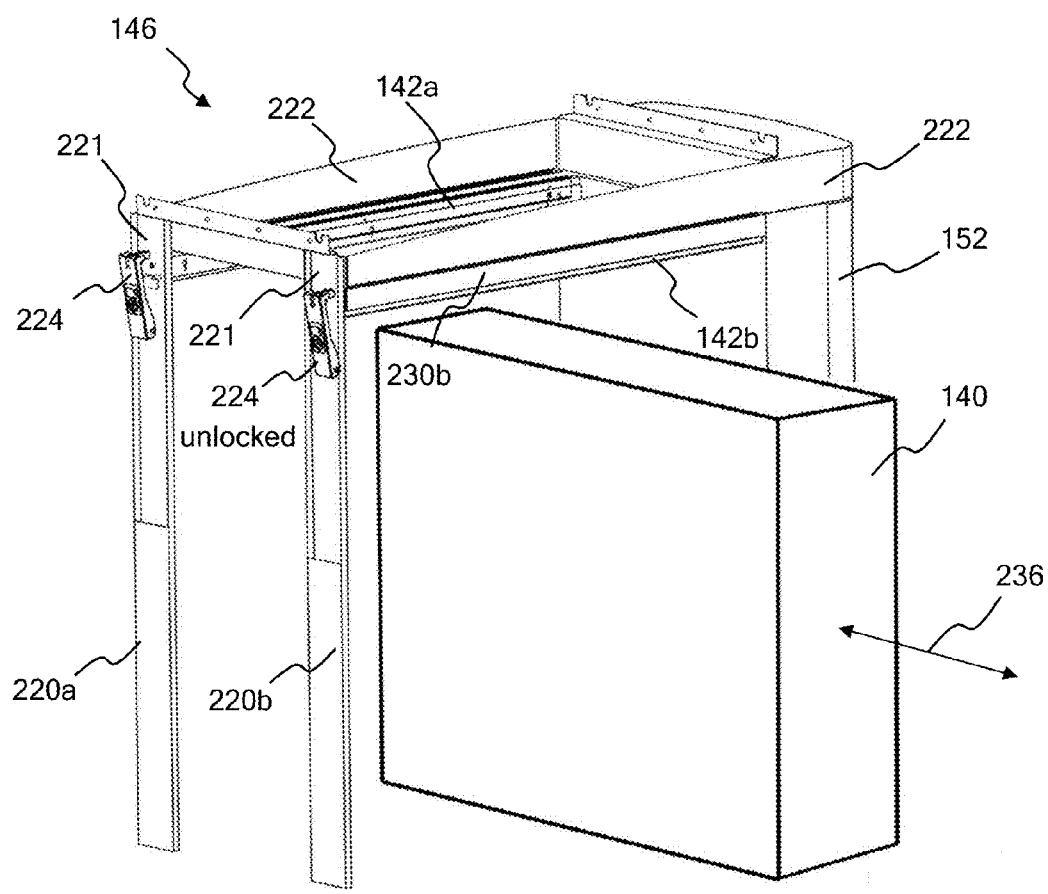
FIG. 13 is a front perspective view of upper concession portion 124 of FIG. 13, with bar lock 224 in the unlocked position, and module locking bars 142a and 142b in the raised position as shown in FIG. 14, such that removable concession modules 140 can be slid into and out of position on lower concession portion 122 of vending service unit body 120.
Figure 14:
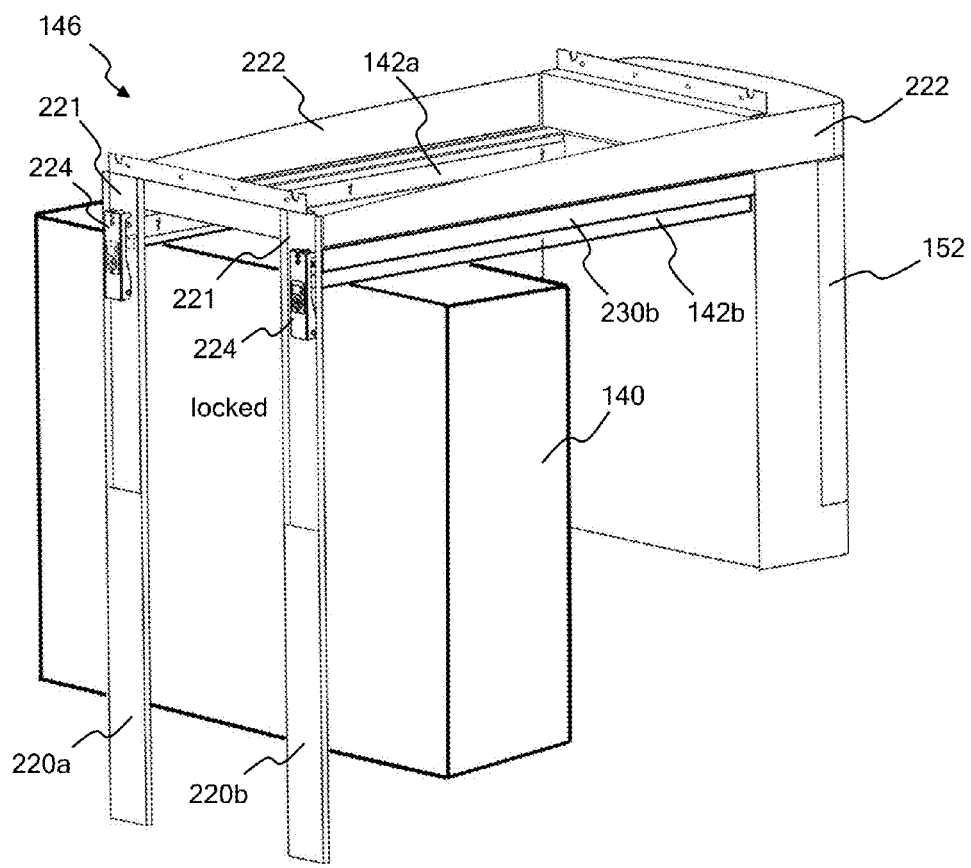
FIG. 14 is a front perspective view of upper concession portion 124 of FIG. 13, with bar lock 224 in the locked position, and module locking bars 142a and 142b locked in the lowered position as shown in FIG. 15, such that removable concession modules 140 are locked in position on lower concession portion 122 of the vending service unit body 120.

Vending service unit body 120 in this embodiment also includes removable module mounting frame 146. Removable module mounting frame 146 couples to lower concession portion frame 123 and to upper convertible beverage module 152, as shown in FIG. 9. Removable module mounting frame 146 is the frame that couples keg beverage concession module 500 and removable module 140 to vending service unit 114, as shown in FIG. 10 through FIG. 14. Removable module mounting frame 146 includes fixed top bars 230 and frame front straps 220. Frame front straps 220 are coupled to lower concession portion frame 123 and extend vertically from lower concession portion frame 123, as shown in FIG. 9. Fixed top bars 230 are coupled between frame front strap 220 top end 221 and upper convertible beverage module 152, as can be seen in FIG. 9 through FIG. 14. Frame sides 222 provide an aesthetic blending between upper concession portion 124 and canopy 117. In this embodiment there are two each of fixed top bars 230, including fixed top bar 230a and 230b, and two each of frame front straps 220, including frame front straps 220a and 220b, as shown in FIG. 10, FIG. 13, and FIG. 14, but this is not meant to be limiting.

Figure 28A:
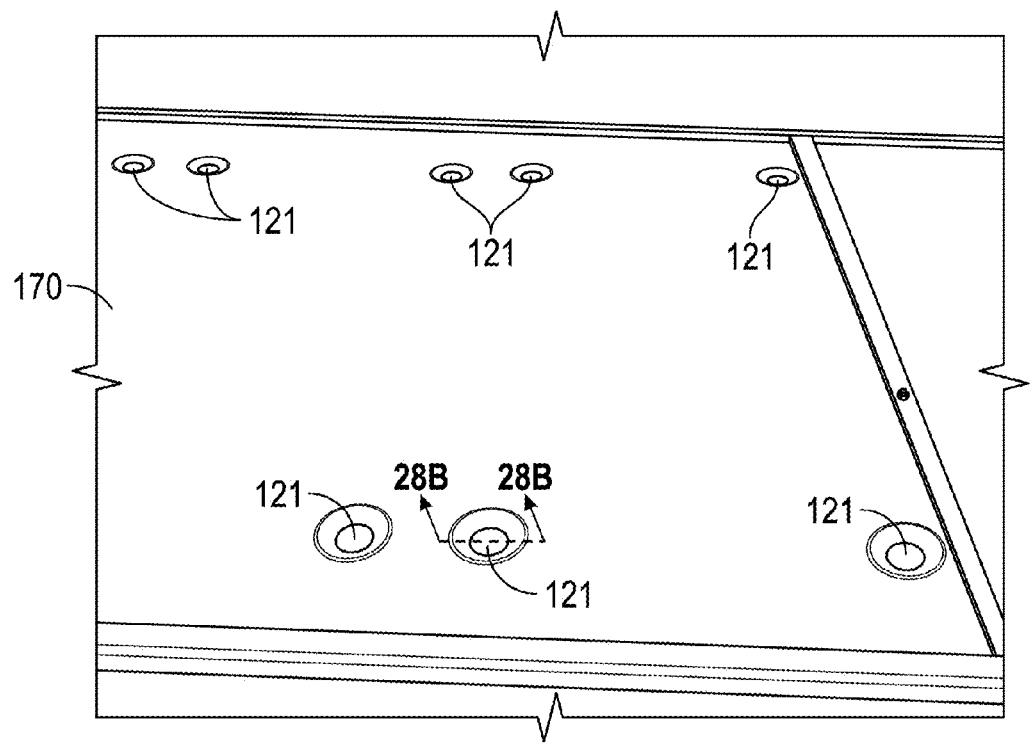
FIG. 28A is a perspective view of recesses 121 in lower concession portion top surface 170.
Figure 28B:
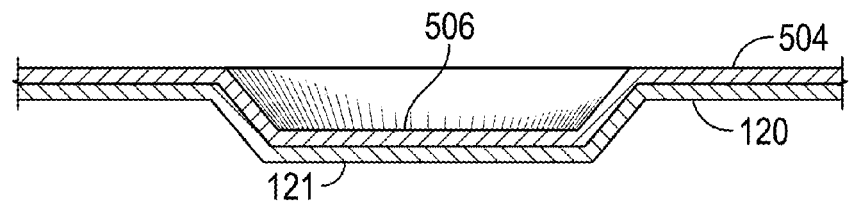
FIG. 28B is a side cutaway view detail of keg beverage service module 500 installed within vending service unit body 120 showing a protrusion 506 of floor 504 nested within recess 121 of lower concession portion top surface 170.

In some embodiments, alignment and stabilization of removable concession module 140 and keg beverage concession module 500 within vending service unit body 120 is facilitated by a recess/protrusion system detailed in FIGS. 28A and 28B. As shown in the figures, lower concession portion top surface 170 contains recess 121. Each recess 121 is an indentation of the sheet metal or other material forming lower concession portion top surface 170. In a typical embodiment, protrusion 506 is placed at each corner of floor 504 of keg beverage concession module 500 and four recesses 121 are oriented on lower concession portion top surface 170 at corresponding locations. With this configuration, when removable concession module(s) 140, including keg beverage concession module 500, is slid into vending service unit body 120 and reaches the position of desired alignment, each protrusion 506 engages with each recess 121 to stabilize and maintain the alignment. The foregoing example is not meant to be limiting. Any array of protrusions 506 and corresponding array of recesses 121 may be used to align removable concession module 140 in vending service unit body 120. In some embodiments, protrusion 506 is on lower concession portion top surface 170 and recess 121 is on removable concession module 140. An additional function of the recess/protrusion system is to create resistance to slippage of the keg beverage concession module 500 out of the vending service unit body 120, and to augment the two ways of locking the keg beverage vending module 500 into the vending service unit 114 which are described below.

Figure 11:
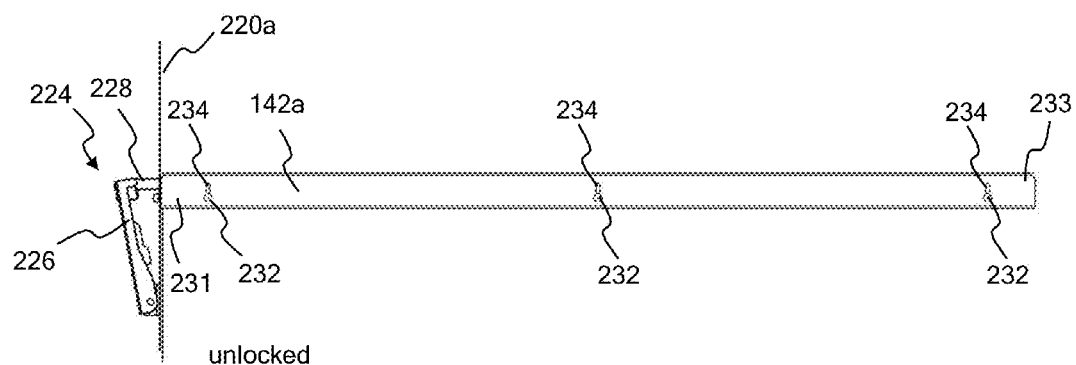
FIG. 11 is a side view of an embodiment of module locking bar 142 and bar lock 224, with bar lock 224 in the unlocked position, and module locking bar 142 in the raised, or unlocked, position.
Figure 12:
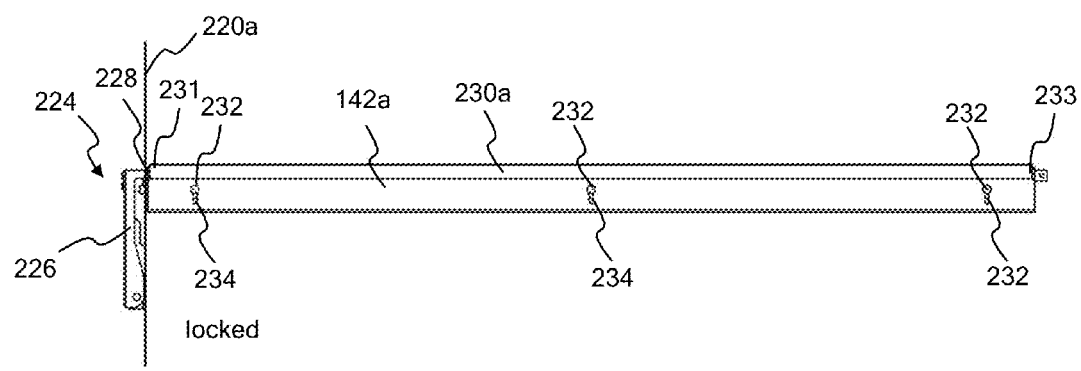
FIG. 12 is a side view of module locking bar 142 and bar lock 224 of FIG. 14, with bar lock 224 in the locked position and module locking bar 142 locked in the lowered position.

Fixed top bars 230 each hold a corresponding module locking bar 142, as shown in FIG. 11 and FIG. 12. In this embodiment fixed top bar 230a holds module locking bar 230a, and fixed top bar 230b holds module locking bar 230b. Each module locking bar 142 raises and lowers in order to lock and release removable concession modules 140 to vending service unit body 120, as shown in FIG. 11 through FIG. 14. FIG. 11 and FIG. 12 is a side view of module locking bar 142a coupled to fixed side bar 220a, showing how module locking bar 142a raises and lowers on fixed side bar 230a. FIG. 11 shows module locking bar 142a in the raised position (fixed side bar 230a is hidden behind module locking bar 142a in this figure). FIG. 12 shows module locking bar 142a in the lowered position. Fixed side bar 230a is coupled to frame front strap 220a at side bar first end 231 (FIG. 10 and FIG. 12). Fixed side bar 230a is coupled to convertible beverage service module 152 at side bar second end 233 (FIG. 10 and FIG. 12). Module locking bar 142a is coupled to fixed side bar 230a using bar mount pins 232, which extend through bar slots 234 in module locking bar 142a to slidably couple module locking bar 142a to fixed side bar 230a.

In some other embodiments, an alternative mechanisms may be employed to lower and fix module locking bar 142 against removable concession module 140 or keg beverage concession module 500. For example, in some embodiments, a screw actuator coupled to module locking bar 142 and engaging vending service unit body 120 is used to lower and fix module locking bar 142 in position against removable concession module 140 of keg beverage concession module 500.

In some embodiments module locking bar 142 frictionally couples removable concession module 140 or keg beverage concession module 500 to vending service unit body 120. In some embodiments, module locking bar 142 further comprise protrusion 506 and removable concession module 140 or keg beverage concession module 500 further comprise recess 121 wherein protrusion 506 engages recess 121 as previously described. In still other embodiments, any positional array of tabs, pins, or other protuberances on locking bar 142 engage a corresponding array of holes, slots, notches, or other examples of a recesses on removable concession module 140 or keg beverage concession module 500.

When module locking bar 142a and 142b are not locked in position, keg beverage concession module 500 and removable concession module 140 can be removed, interchanged, and slid into place on vending service unit body 120, as shown in FIG. 13. Thus, module locking bar 142 couples removable concession module 140 to vending service unit 114 in the embodiment of vending service unit 114 shown in the figures. In this embodiment removable module mounting frame 146 includes first and second module locking bars 142a and 142b. First module locking bar 142a is coupled to removably module mounting frame 146. Second module locking bar 142b is coupled to removable module mounting frame 146. First and second module locking bars 142a and 142b couple keg beverage concession module 500 or removable concession module 140 to vending service unit body 120.

In the embodiment of vending service unit 114 shown in the figures, keg beverage concession module 500 or removable concession module 140 is removeably coupled to vending service unit body 120, as shown in FIG. 13 and FIG. 14. In the embodiment shown in FIG. 1 through FIG. 7, four removable concession modules 140 are removeably coupled to vending service unit body 120. Keg beverage concession module 500 or removable concession module 140 is positioned between upper convertible beverage service module 152 and frame front straps 220, as shown in FIG. 12. Once keg beverage concession module 500 or removable concession module 140 is set in place on lower concession portion upper surface 170, keg beverage concession module 500 or removable concession module 140 can be locked in place on lower concession portion top surface 170. In the embodiment shown in the drawings, keg beverage concession module 500 or removable concession module 140 is locked in place in two ways.

The first way that keg beverage concession module 500 or removable concession module 140 is locked in place on vending service unit body 120 is with module locking bar 142. A module locking bar 142 is locked over the top of keg beverage concession module 500 or removable concession module 140 so that keg beverage concession module 500 or removable concession module 140 is held in place from above, as shown in FIG. 12 and FIG. 14. Removable concession module locking bar 142 keeps keg beverage concession module 500 or removable concession module 140 from moving sideways. In some embodiments, one or more protrusions 506 from the floor 504 of keg beverage concession module 500 or removable concession module 140 also keep keg beverage concession module 500 or removable concession module 140 from moving sideways. Protrusion 506 is received by corresponding recess 121 in lower concession portion top surface 170, shown in FIG. 29A and FIG. 29B. One example of a protrusion 506 is a relatively flat and broad circular inverted dent in the sheet steel or other material comprising the floor 504. With a broad, flat protrusion 506 and recess 121, the module can be easily slid into or out from vending service unit 114 when module locking bars 142a and 142b are in the raised position with minimal upward displacement of keg beverage concession module 500 or removable concession modules 140. Keg beverage concession module 500 or removable concession module 140 that are in position on lower concession portion top surface 170 are locked in place in response to module locking bars 142a and 142b being locked in the lowered position, as shown in FIG. 12 and FIG. 14. In some embodiments, module locking bars 142 are locked in the lowered position in response to bar lock levers 224 and bar lock pins 228 being placed in the locked position. In other embodiments, other locking mechanisms may be used, as described above. In this way, keg beverage concession module 500 or removable concession module 140 is coupled to vending service unit body 120 of vending service unit 114 in response to module locking bars 142 being locked in the lowered position.

Figure 16:
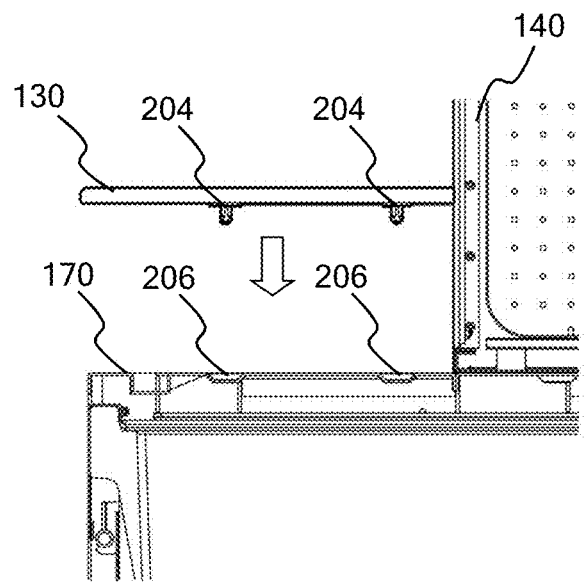
FIG. 16 is a cutaway view of the portion of the vending service unit 114 of FIG. 18 showing first counter portion 130 removed from lower concession portion top surface 170.

FIG. 11 and FIG. 16 show how keg beverage concession module 500 or removable concession module 140 can be removed from vending service unit 114 in response to module locking bars 142 being in the unlocked position. When bar lock lever 224 and bar lock pin 228 are in the unlocked position, module locking bar 142 is free to slidably move up and down on bar mount pin 232, and keg beverage concession module 500 or removable concession module 140 can be removed or added to vending service unit 114, as shown in FIG. 11 and FIG. 13.

Figure 7:
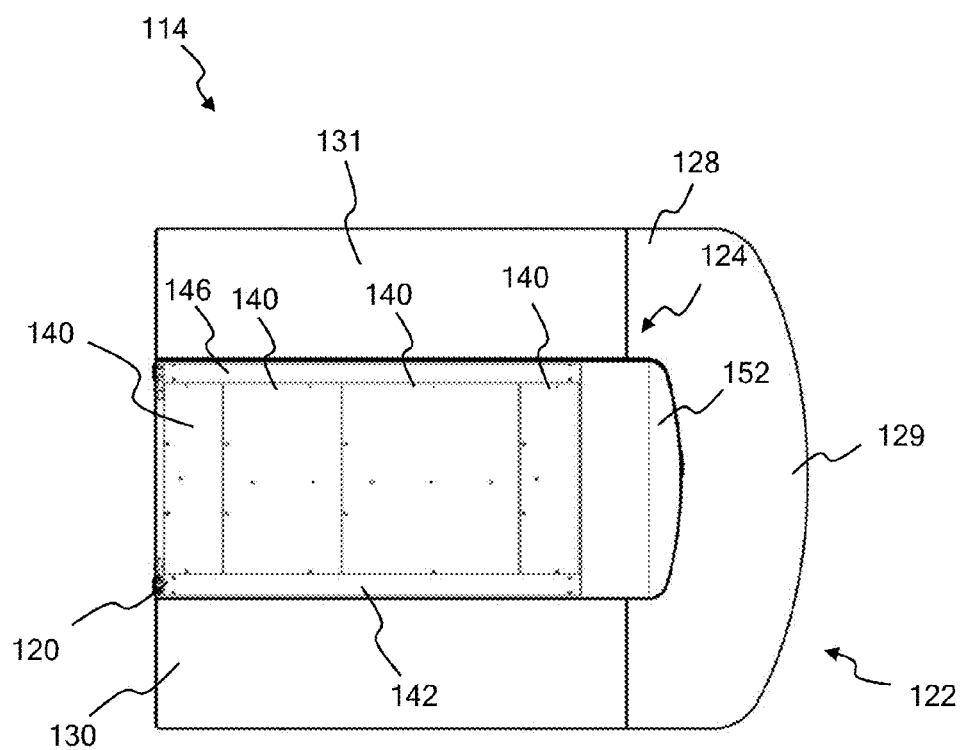
FIG. 7 is a top view of the vending service unit 114 of FIG. 1.
Figure 8:
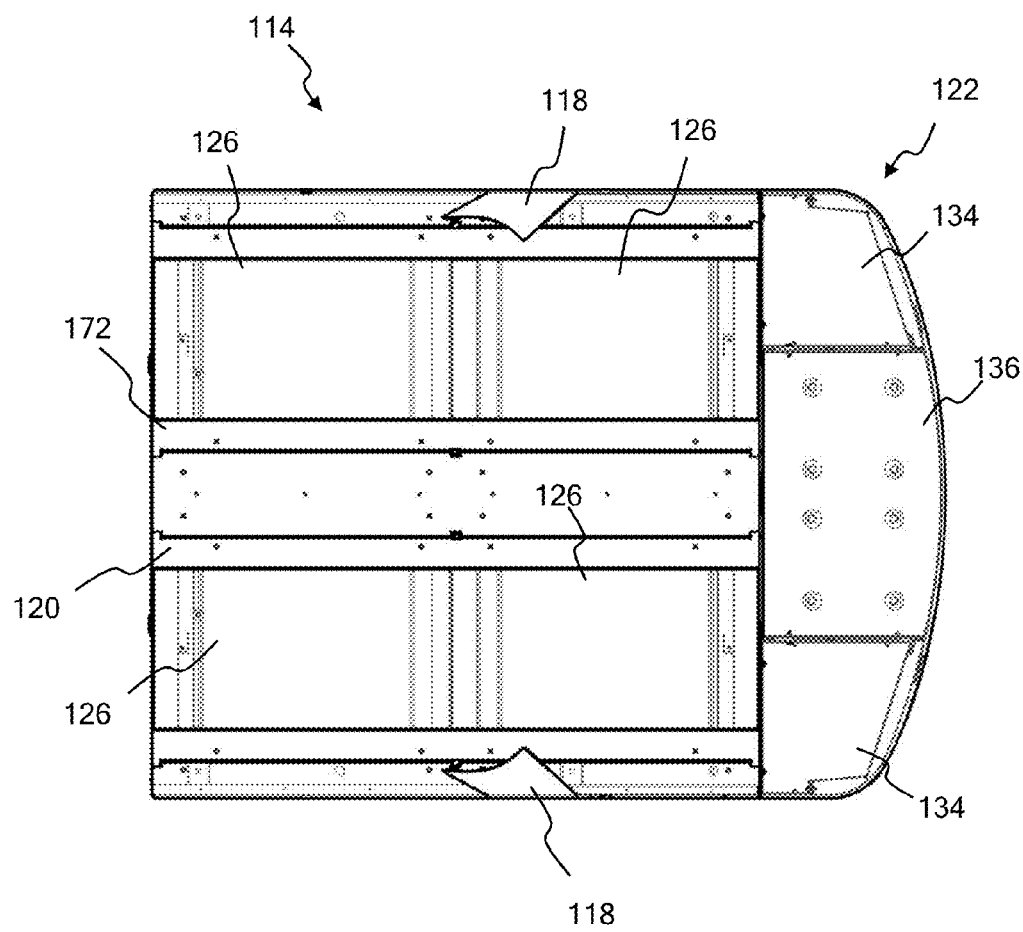
FIG. 8 is a bottom view of the vending service unit 114 of FIG. 1
Figure 15:
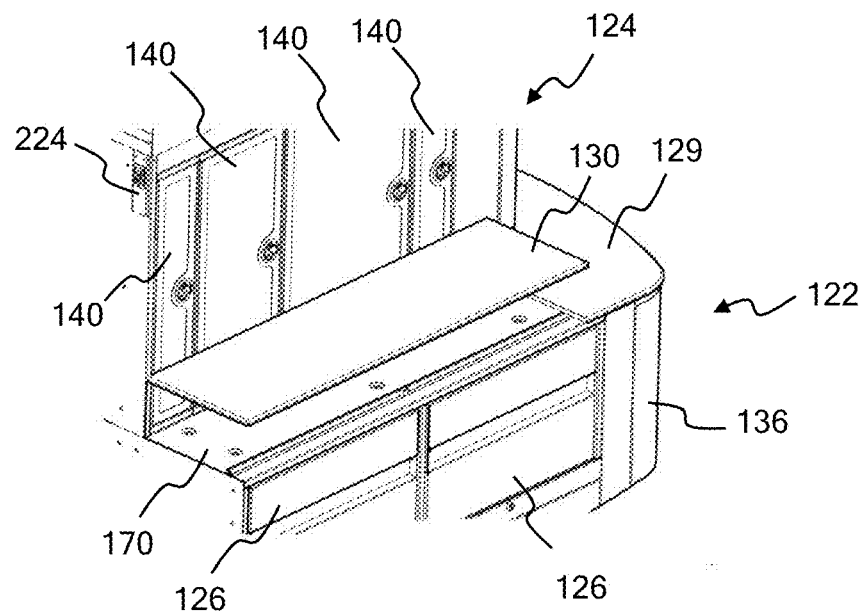
FIG. 15 is a front perspective view of a portion of the vending service unit 114 of FIG. 6, showing an embodiment of first counter portion 130 removed from lower concession portion top surface 170.
Figure 17:
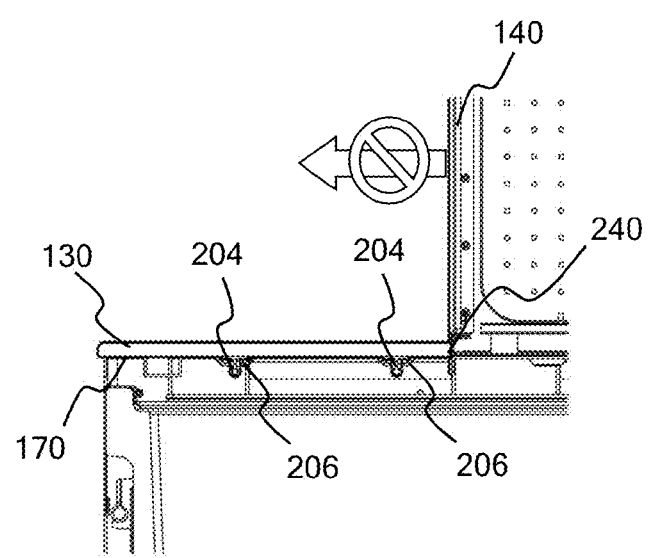
FIG. 17 is a cutaway view of the portion of the vending service unit 114 of FIG. 18 showing first counter portion 130 coupled to lower concession portion top surface 170, which prevents removable concession module 140 from being removed from vending service unit 114.

The second way that keg beverage concession module 500 or removable concession module 140 is coupled to lower concession portion top surface 170 of vending service unit 114 is by removable counter portions 130 and 131. Counter 128 has counter end portion 129, and first and second counter portions 130 and 131 (FIG. 7). In this embodiment first counter portion 130 is repeatably removable by the operator of vending service unit 114. In some embodiments both first and second counter portions 130 and 131 are repeatably removable by the owner of vending service unit 114. First and second counter portions 130 and 131 keep keg beverage concession module 500 or removable concession module 140 from moving side-to-side on lower concession portion top surface 170, as shown in FIG. 15 through FIG. 17. First removable counter portion 130 in this embodiment includes counter couplers 204, as shown in FIG. 16. Lower concession portion top surface 170 includes counter coupler receivers 206, as shown in FIG. 16. Counter couplers 204 can be repeatably coupled to and uncoupled from counter coupler receivers 206, which repeatably couples and uncouples first removable counter portion 130 to lower concession portion top surface 170.

When first removable counter portion 130 is coupled to lower concession portion top surface 170 using counter couplers 204 and counter coupler receivers 206 as shown in FIG. 15 through FIG. 17, first counter portion 130 overlaps keg beverage concession module 500 or removable concession module 140 at overlap joint 240, as shown in FIG. 17. Keg beverage concession module 500 or removable concession modules 140 are prevented from sliding towards first counter portion 130 in response to first counter portion 130 being coupled to lower concession portion top surface 170. Similarly, keg beverage concession module 500 or removable concession modules 140 are prevented from sliding towards second counter portion 131 in response to second counter portion 131 being coupled to lower concession portion top surface 170. In this embodiment of vending service unit 114, second counter portion 131 is fixedly attached to lower concession portion top surface 170 at the factory. First counter portion 130 is removeably coupled to lower concession portion 130 so that the owner of vending service unit 114 can repeatably remove first counter portion 130 to interchange keg beverage concession module 500 and removable concession modules 140. In some embodiments, both first and second counter portions 130 and 131 are removeably coupled to lower concession portion top surface 170.

Thus, in the embodiment of vending service unit 114 shown in the figures, keg beverage concession module 500 or removable concession module 140 is removeably coupled to vending service unit body 120 using module locking bars 142 and first and second removable counter portions 130 and 131. Module locking bars 142 removeably couple each removable concession module 140 to vending service unit body 120. Each of the keg beverage concession module 500 or removable concession modules 140 are prevented from being removed from vending service unit body 120 in response to friction of the module locking bars 142 against the keg beverage concession module 500 or removable concession modules 140. One more recesses 121 in the lower concession portion top surface 170 receive one or more protrusions 506 on the floor 504 of the keg beverage concession module 500 or removable concession modules 140 to further resist displacement or misalignment of the keg beverage concession module 500 or removable concession modules 140 from within the vending service unit 114. Each of the keg beverage concession module 500 or removable concession modules 140 are also prevented from being removed from vending service unit body 120 in response to first and second counter portions 130 and 131 being coupled to vending service unit body 120.

It is to be understood that the means and method for coupling removable keg beverage concession module 500 or concession modules 140 to vending service unit body 120 as shown in the figures is an example only. Keg beverage concession module 500 or removable concession module 140 can be coupled to vending service unit body 120 and/or vending service unit 114 using any suitable means that allows removable concession modules 140 to be repeatably coupled to and uncoupled from vending service unit body 120.

Figure 18:
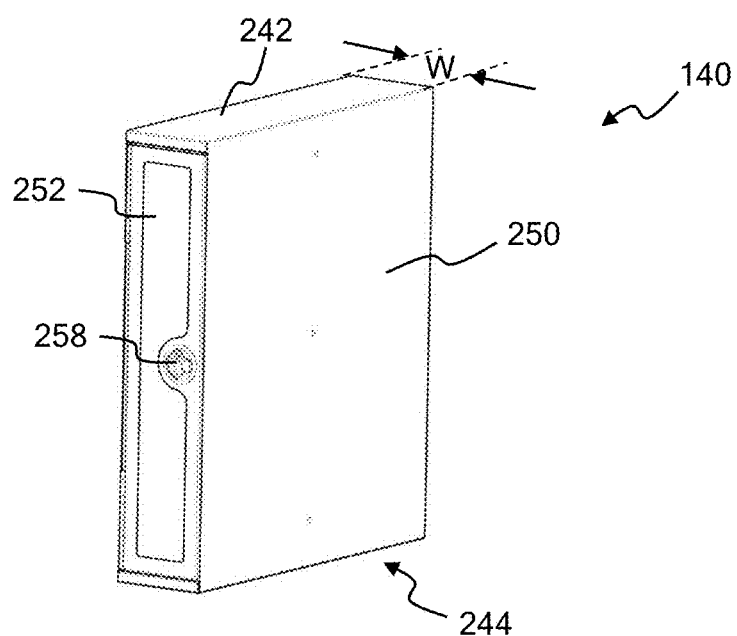
FIG. 18 is a perspective view of an embodiment of removable concession module 140 according to the invention.

Removable concession modules 140, including a keg beverage concession module 500, each removeably and repeatably couple to vending service unit body 120, as discussed previously. Vending service unit 114 includes a removable concession module 140, where each of the removable concession modules 140 removeably and repeatably couples to vending service unit body 120. A keg beverage concession module 500 is an example of a removable concession module 140. Removable concession module 140 can have any size and shape according to the particular design of vending service unit 114, vending service unit body 120, and removable concession module 140. Similar to the removable concession module 140 in the embodiment shown in FIG. 18 having a width W, the keg beverage concession module 500 also has a width that is a multiple of 6 inches. In some embodiments, the width of the keg beverage concession module 500 is 36 inches. This gives the vendor the option of using keg beverage concession module 500 with removable concession module(s) 140 of different widths W to be interchanged as desired.

Figure 22:
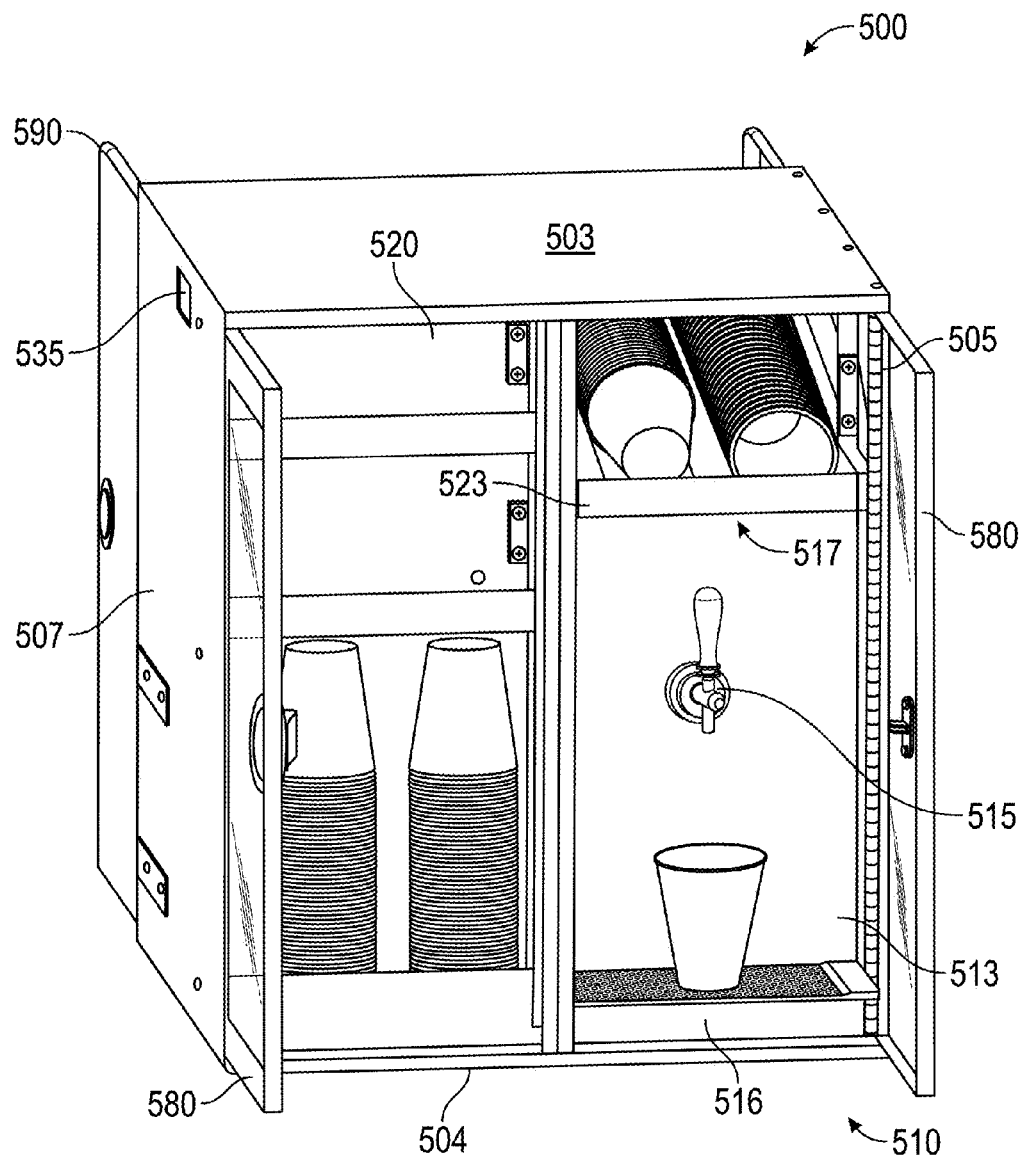
FIG. 22 is a side perspective view of keg beverage concession module 500 installed in vending service unit body 120 with a server side door 580 door open, revealing tap compartment 511.

In the embodiment of keg beverage concession module 500 shown in the figures, keg beverage concession module 500 is generally a rectangular-shaped box, as shown in FIG. 22. Keg beverage concession module 500 in the embodiment shown in FIG. 24 includes a ceiling 503, a floor 504, a first wall 505, a second wall 507, a server side door 580, and a supply side door 590. The ceiling 502, first wall 505, second wall 507, and floor 504 bound and enclose the keg beverage service module 500 on four of six sides. The remaining two sides are bounded and enclosed by server side door 580 and supply side door 590. Server side door 580 and supply side door 590 open to allow access to the various compartments inside keg beverage concession module 500. Some embodiments feature a handle 535 coupled to first wall and second wall to allow for easier insertion and removal of keg concession module 500 from vending service unit 114. In some embodiments, the handle 535 is recessed flush with or beneath the outer surface of first wall 502 and second wall 507.

Figure 19:
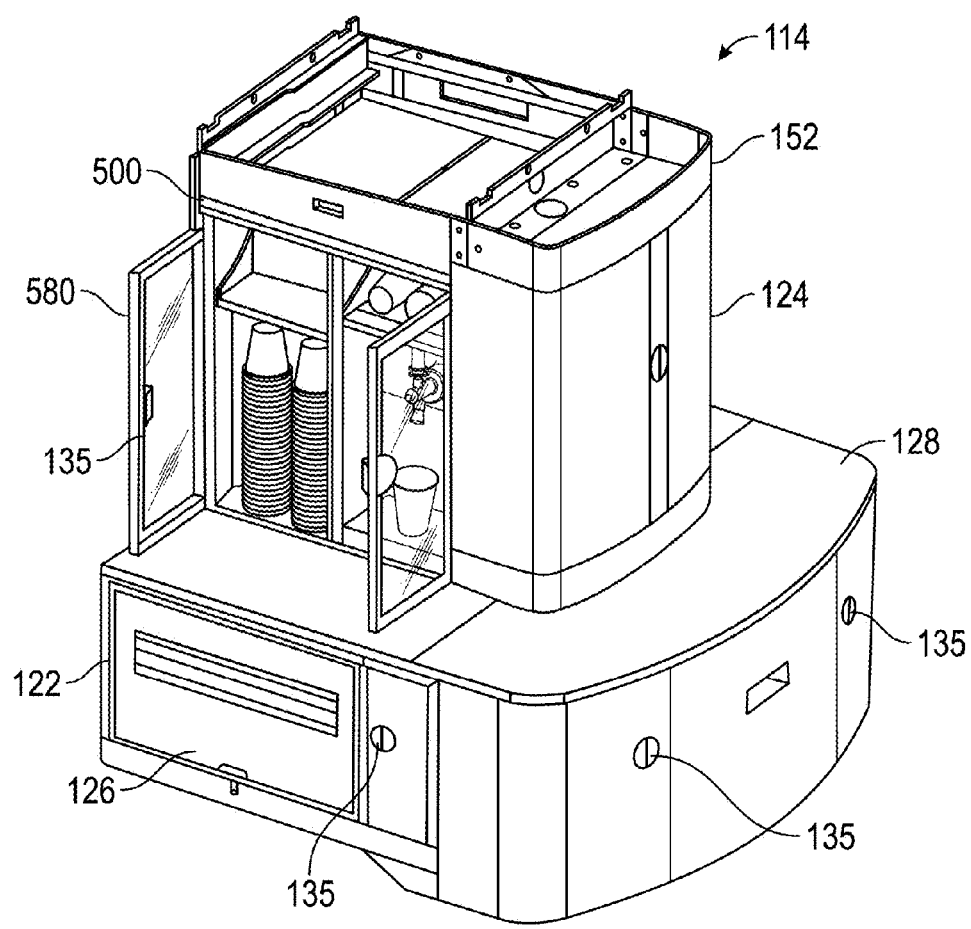
FIG. 19 is a rear-side perspective view of an embodiment of vending service unit 114 with keg beverage concession module 500 installed and two server side doors 580 open.
Figure 20:
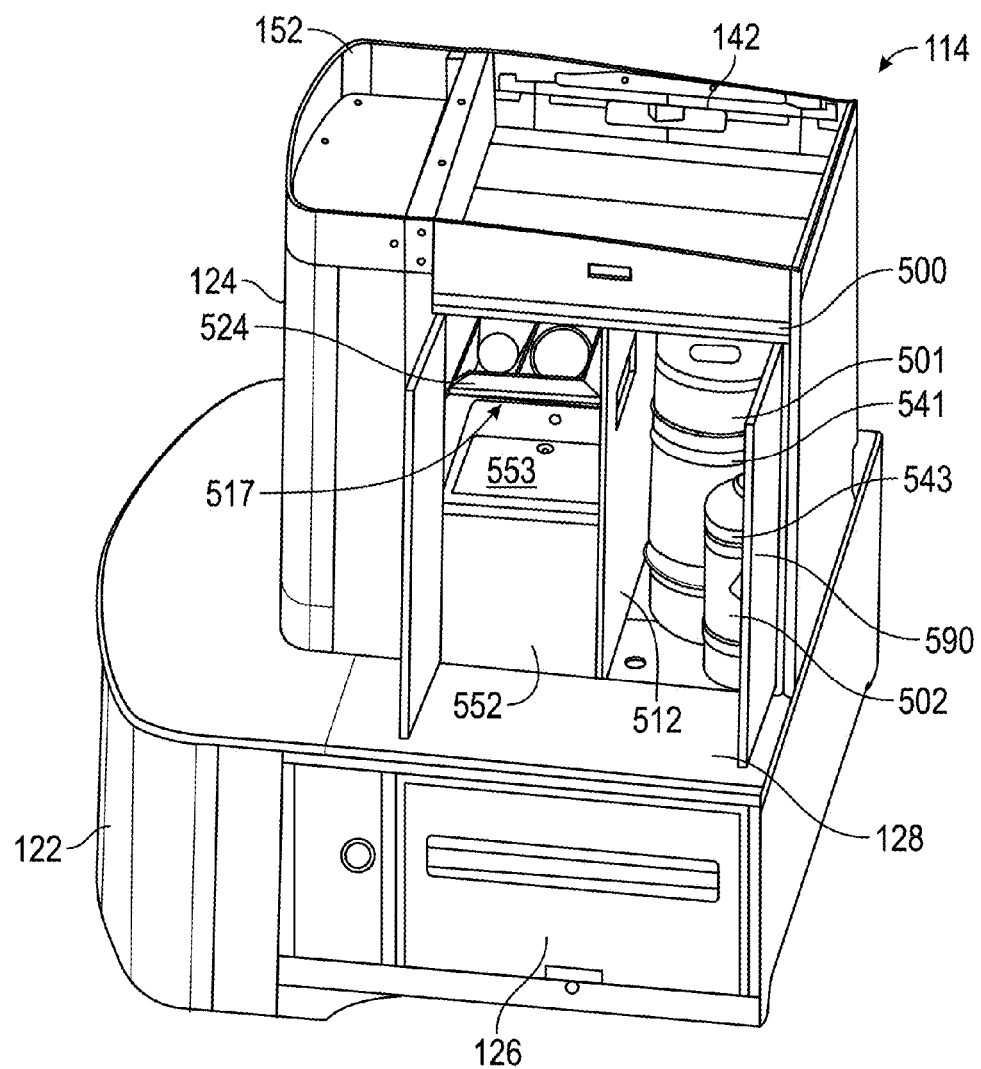
FIG. 20 is a side perspective view of an embodiment of vending service unit 114 with keg beverage module 500 installed with two supply side doors 590 open.

When installed within upper concession portion 124 of vending service unit 114, floor 504 of keg beverage concession module 500 rests on lower concession portion top surface 170. This is generally shone by FIG. 19, and FIG. 20. Also shown in FIG. 19 and FIG. 20 is a vending service unit 114 configured to receive only one removable concession module 140 or keg beverage vending module 500. Other configurations of vending service unit 114 are designed to receive a keg beverage concession module 500 and one or more removable concession modules 140 as shown by FIG. 1, FIG. 2, FIG. 3, FIG. 4, FIG. 5, and FIG. 6, for example.

Figure 23:
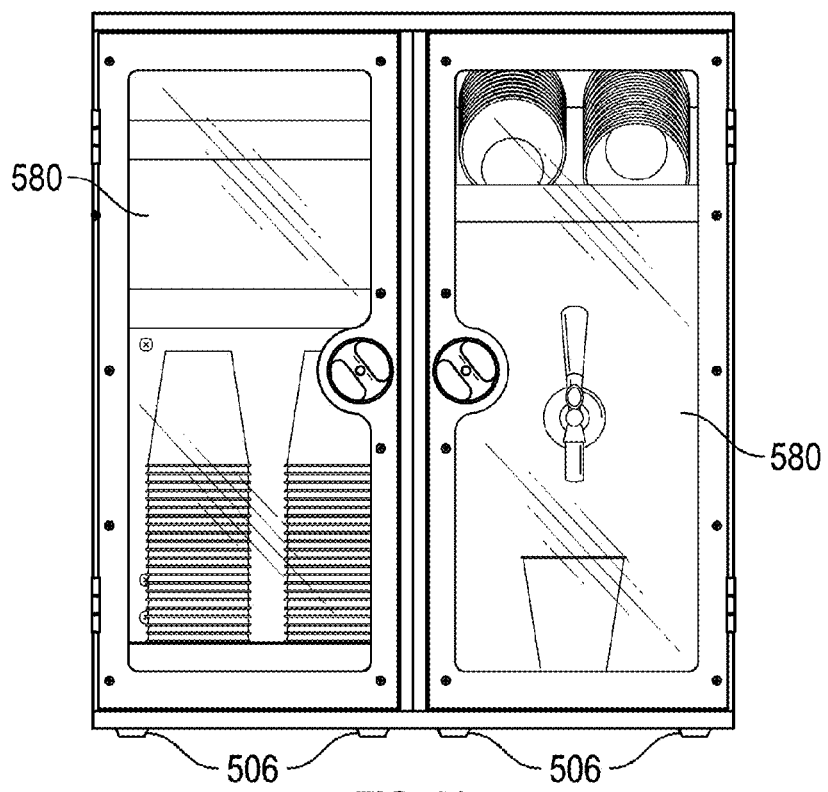
FIG. 23 is a side view of server side 510 of keg beverage concession module 500 with two server side doors 580 closed.
Figure 24:
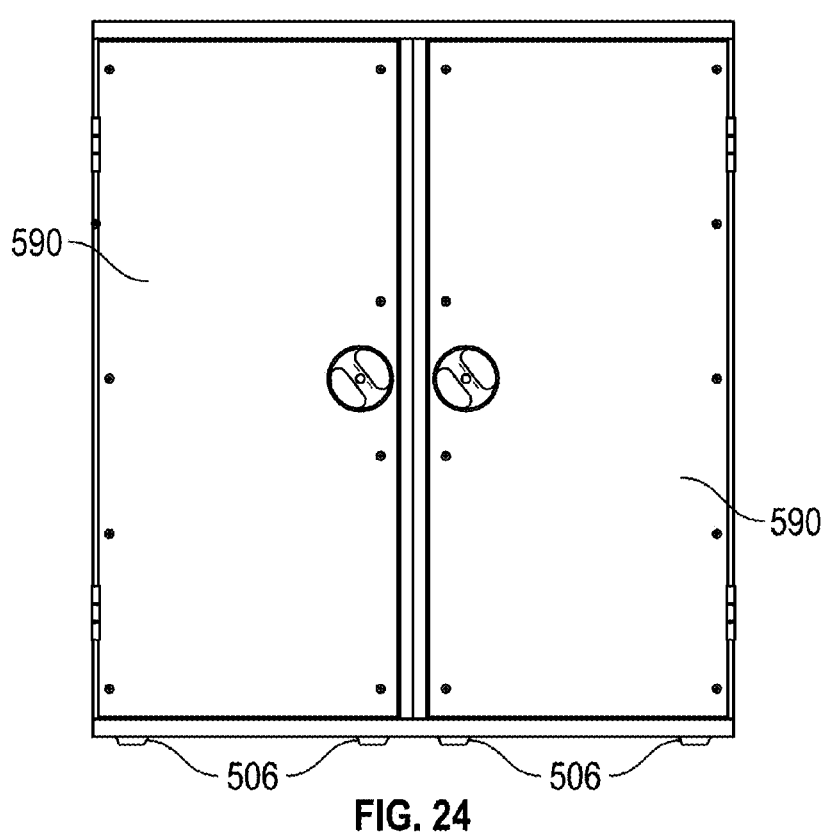
FIG. 24 is a side view of supply side 530 of keg beverage concession module 500 with two supply side doors 590 closed.
Figure 27:
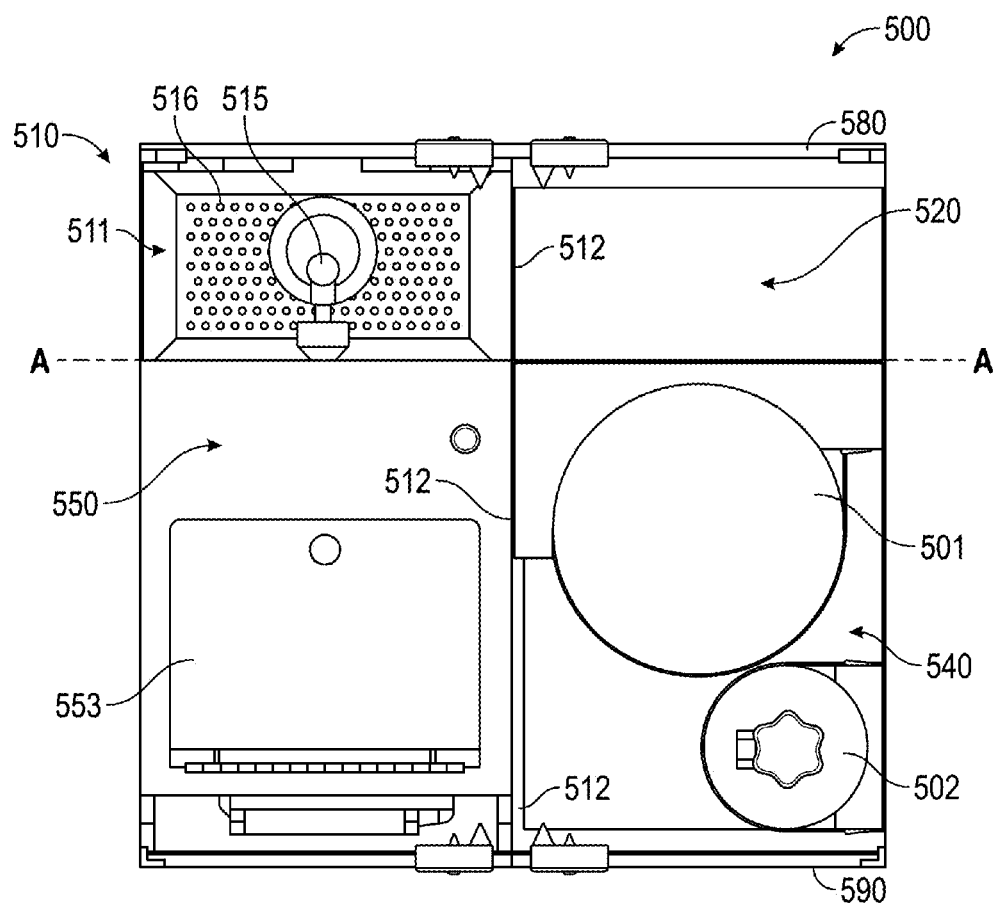
FIG. 27 is a top view of keg beverage concession module 500.

The keg beverage concession module 500 has a server side 510 and a supply side 530, as shown in the figures. FIG. 27 is a top view of keg beverage concession module showing the general division of keg beverage concession module 500 into server side 510 and supply side 530. Server side 510 and supply side 530 are situated on opposite sides of line "A." In the embodiments shown in the figures, server side 510 is located on the driver's side of utility vehicle 110. This facilitates quick access by the utility vehicle operator to beverage service without the need to go around to the opposite side of utility vehicle 110. Division of the module into opposite sides based on functional considerations also separates the mechanical workings of the invention, which are located in the supply side 530 and generally hidden from the customer by supply side door(s) 590 as seen in FIG. 24, from the vending area which houses more aesthetic features of the invention located in the server side. Some embodiments of the invention feature clear panels on server side doors 580, as shown by FIG. 23.

Supply side 530 and server side 510 are further subdivided into two additional sections each by partition 512. FIG. 27 shows partition 512 generally perpendicular to supply side door 590 and server side door 580. Partition 512 divides supply side 530 divided into keg storage compartment 540 and cooling compartment 550, and also divides server side 510 into tap compartment 511 and storage compartment 520, as shown in FIG. 27.

Figure 25:
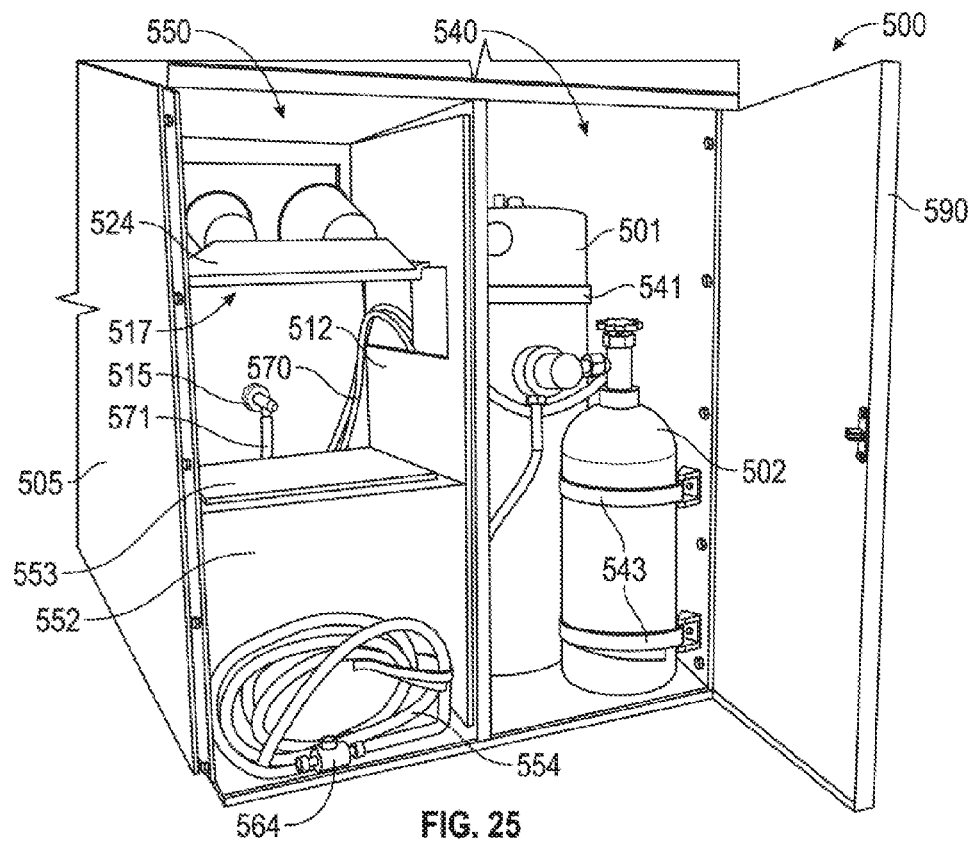
FIG. 25 is a side perspective view of the supply side 530 of keg beverage concession module 500 with supply side door 590 open. Keg 501 and compressed gas cylinder 502 are installed.
Figure 26:
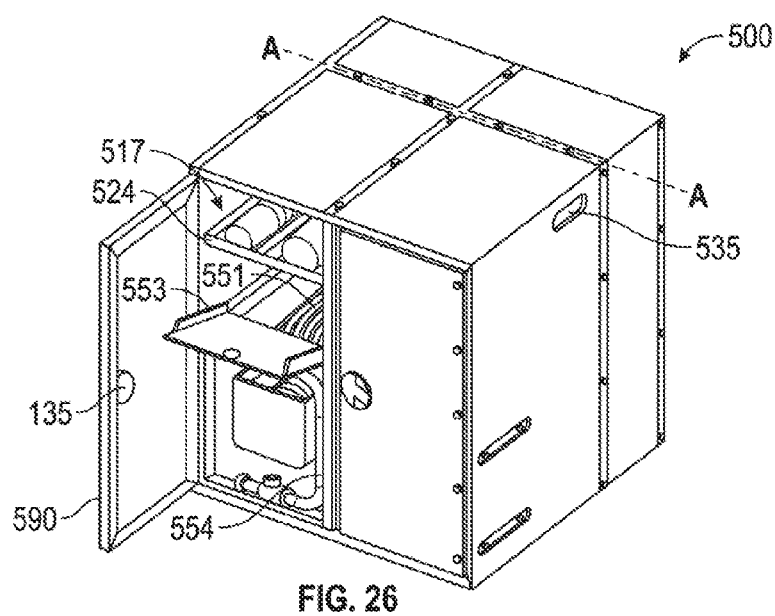
FIG. 26 is a top/side perspective view of supply side 530 of keg beverage concession module 500 with one supply side door 590 open to cooling compartment 550 and bin lid 553 open for access to ice bin 552 and cooling coil 551.

Keg storage compartment 540 is a supply side 530 sub-compartment and is shown in FIG. 20, FIG. 25, and FIG. 27. Keg storage compartment 540 is bounded by floor 504, a wall 505, partition 512, ceiling 503, and supply side door 590. As shown in the figures, keg storage compartment contains a keg mounting bracket 541 for securing a keg 501 and a cylinder mounting bracket 543 for securing a gas cylinder 543.

Compressed gas contained by compressed gas cylinder 502, usually carbon dioxide or air, is used to provide constant keg pressurization without the need for hand pumping. Keg pressurization is necessary to dispense the beverage contained within keg 501. Keg 501 containing the keg beverage to be transported and dispensed, usually beer or wine, is secured within keg storage compartment 540 as shown in FIG. 20, FIG. 25, and FIG. 27. Beverage kegs and compressed gas cylinders are generally bulky, dense, and contain gas and liquid materials under pressure retained by a valve assembly. Valve assemblies are typically somewhat fragile and subject to failure when struck by other objects, or when striking other objects such as when a compressed gas cylinder falls over striking the valve assembly on the floor. The sudden jettison of gas or liquid under pressure from a keg or cylinder following valve failure can turn the keg, cylinder, or pieces of the valve into dangerous projectiles. Accordingly, it is important to secure kegs or compressed gas cylinders during transport, when they are most vulnerable to damage. Keg 101 and compressed gas cylinder 102 are secured within keg storage compartment 540 to wall 505 by keg mounting bracket 541 and cylinder mounting bracket 543 respectively. In some embodiments of the invention, the keg mounting bracket 541 is positioned on wall 505 midway between the supply side door 590 and server side door 580 such that keg 501 is centered along a midline axis of vending service unit 114. Securing keg 501 in this position minimizes sway of utility vehicle 110 as the utility vehicle 110 is with the attached vending service unit 114 is used to transport a keg 501, which is heavy when filled relative to the weight of utility vehicle 110, between locations. The location of keg storage compartment 540 forward of cooling compartment 550 allows for positioning of keg 501 as far forward relative to utility vehicle 110 as possible, also adding to stability while the cart is being driven.

In some embodiments of the invention, keg mounting bracket 541 and cylinder mounting bracket 543 are a means to secure keg 101 and compressed gas cylinder 102 to wall 505 of keg beverage concession module 500. Examples of such means include any bracket-type structure coupled to wall 505 which includes a strap and latching mechanism. The bracket portion of keg mounting bracket 541 and cylinder mounting bracket 543 may be fabricated from steel, aluminum, other metal or metal alloy, injection-molded plastic, or any other suitably durable material. The keg mounting bracket 541 and cylinder mounting bracket 543 are coupled to wall 505 with any suitable fastening means, such as screws or rivet fasteners for example. In some embodiments, keg mounting bracket 541 and cylinder mounting bracket 543 utilize a retaining band of woven fabric, such as a 1½" wide length of nylon webbing, for example; or a semi-rigid metal retaining band to encircle keg 501 and compressed gas cylinder 502. In these embodiments, the retaining band encircling keg 501 and compressed gas cylinder 501 is adjustable and reversibly fixed by means of a buckle or other adjustable strap retaining device known to those skilled in the art. Alternatively, the retaining bands of keg mounting bracket 541 and cylinder mounting bracket 543 may be curved bands of sheet steel, aluminum, or other semi-rigid material. In embodiments of the invention where a semi-rigid material is used, the keg mounting bracket 541 and cylinder mounting bracket 543 have a hinge, pin, or other connecting means allowing the retaining band to pivot open to allow positioning of keg 501 or compressed gas cylinder 543 and pivot closed around keg 501 or compressed gas cylinder 503. In this way, a retaining band of keg mounting bracket 541 and cylinder mounting bracket 543 can be swung out to receive a keg 501 or compressed gas cylinder 502, and then swung back to encircle and secure keg 501 or compressed gas cylinder 502 in a fixed position within keg storage compartment 540. In some embodiments of the invention, keg mounting bracket 541 and cylinder mounting bracket 543 further comprise a locking means such that the retaining band may be locked closed over keg 501 and compressed gas cylinder 502 as a security measure to prevent theft of keg 501 or compressed gas cylinder 502.

In some embodiments of the invention, cylinder mounting bracket 543 comprises a hanging means (not shown in the figures) by which compressed gas cylinder 502 is hung against the inner surface of supply side door 590. An example of such a hanging means is an S-shaped hanger, which engages the top edge of supply side door 590 on one side and a standard pressure gauge/valve assembly at the top end of compressed gas cylinder 502. In some embodiments, the hanging means is fixedly connected to supply side door 590; in other embodiments, the hanging means is removably connected to supply side door 590. In these and other embodiments of the invention, the hanging means is removably connected to the compressed gas cylinder 502.

Any suitable design and material from the prior art may be used to construct keg mounting bracket 541 and cylinder mounting bracket 543; the examples discussed above and shown in the cited figures are illustrative and not meant to be limiting.

The keg beverage to be dispensed passes from keg 501 to beverage cooling coil 551, located in cooling compartment 550, through warm side tubing 570 shown in FIG. 25. A proximal end of warm side tubing 570 attaches to keg 501 via any standard means well known in the prior art for connecting tubing used to dispense keg beverages to kegs. Warm side tubing 570 traverses between keg storage compartment 540 and cooling compartment 550 through partition 512. A distal end of warm side tubing 570 attaches to cooling coil 551 via a second connecting means, also well known in the prior art.

Cooling compartment 550 is also a supply side 530 sub-compartment and is in FIG. 20, FIG. 25, FIG. 26, and FIG. 27. Cooling compartment 550 is bounded by floor 504, first wall 505, ceiling 503, supply side door 590, and partition 512. Cooling compartment 550 further comprises cooling coil 551, ice bin 552, bin lid 553, first shelf 517, drain hose 554, and cold side tubing 571, all shown in FIG. 25. In an example embodiment of the invention, warm keg beverage leaves keg 501 into proximal end of warm side tubing 570 and flows through warm side tubing 570 traversing partition 512 into cooling compartment 550, through distal end of warm side tubing 570 into beverage cooling coil 551. The distal end of warm side tubing 570 is connected to a proximal "warm" end of beverage cooling coil 551 using any widely available connecting means know in the prior art. Beverage cooling coil 551 is located within ice bin 552 and is immersed within crushed or cubed ice, or an icy slush contained within ice bin 552.

Beverage cooling coil 551, in some embodiments, is a stacked coil of tubing. Many configurations may be used. In one embodiment, the coil is a stacked series of outer windings transitioning to a similarly stacked series of inner windings concentrically located within the outer windings. This design maximizes the surface area interface between the keg beverage and ice or other cooling means housed within ice bin 552 through the wall of cooling coil 551. In various embodiments of the invention, beverage cooling coil 551 is made from plastic, metal, or other suitable material.

In some embodiments of the invention, beverage cooling coil 551 is made from stainless steel tubing 100 feet long with an inside diameter of 0.335 inches and an outside diameter of 0.375 inches which tapers to a 20 foot length of stainless steel tubing with an outside diameter of 0.250 inches and an inside diameter of 0.0210 inches in a stacked vertical column of forty rings of tubing forming two coils, one concentrically located within the other. The proximal end through which the uncooled keg beverage enters the beverage cooling coil is at the top ring of the outer coil and the distal end from which the cooled keg beverage emerges is on the top ring of the inside coil. The proximal 100 feet of coil is the larger (0.375 outside diameter) tubing and the distal 20 feet of coil is the smaller (0.250 outside diameter) tubing. The stainless steel tubing of the lowest ring of the outer coil transitions to become the lowest ring of the inner coil. Stainless steel is a relatively efficient heat conductor. The concentric coil-within-a-coil design described also acts as a counter-current heat exchanger, with a continuous gradient of warm keg beverage in each successive outer ring flowing in opposite directions from cooler keg beverage in the adjacent successive inner rings, further increasing the efficiency of heat exchange. In this way, the cooled keg beverage emerging from the distal end of beverage cooling coil 551 has been cooled by the surrounding ice/ice-slush mixture.

The keg beverage, now chilled, exits cooling coil 551 into cold side tubing 571 via a connecting means and traverses fascia opening 514 of fascia 513 to enter the cooling compartment-end of spigot 515, shown in FIG. 25. Spigot 515 is also accessed from tap compartment 511, described in a later section below. Cold side tubing 517 and connecting means comprise existing commercially available devices widely known in the prior art.

In some embodiments of the invention, ice bin 552 is used to contain the ice or an ice-slush mixture for cooling the keg beverage within the beverage cooling coil. The ice is regained within ice bin 552 by bin lid 553. In some embodiments of the invention, bin lid 553 sits atop ice bin 552 and is removed to allow filling of ice bin 552 with ice, for example. In a preferred embodiment, however, ice bin 552 is hingedly connected to the front top of ice bin 552 nearest supply side door 590 such that when in a partially open position, bin lid 553 is a "chute" which funnels ice into ice bin 552. Accordingly in these embodiments, the connecting hinge ideally extends along an entire length of bin lid 553 to strengthen the hinged connection with ice bin 552, minimizing the chance of damage to the hinge from the weight of ice sliding down bin lid 553 into ice bin 552 during filling of ice bin 552.

In some embodiments, meltwater from melting ice housed within ice bin 552 is drained from ice bin 552 by a meltwater collection system. As shown in the two embodiments illustrated in FIG. 25 and FIG. 26, embodiments of the meltwater collection system include a drain hose 554 with a proximal and coupled to ice bin 552 and a distal end coupled to a shutoff valve 555. The location of coupling drain hose 554 to ice bin 552 should be in any gravity-dependent position at or near the bottom of ice bin 552. When keg beverage vending module 500 is in use and it is not desirable or convenient for meltwater to drain onto the ground, shutoff valve 555 is in the "closed" position, preventing the flow of meltwater, and drain hose 554 may be stored in a neat coil or otherwise next to ice bin 552. Meltwater hose may alternatively be stored in other locations, within or external to keg beverage vending module 500. Some embodiments of the invention may utilize a bracket, a Velcro strap, or other accessory means for storing drain hose 554 in a neat and stable configuration. The meltwater collection system is used to drain meltwater onto the ground or into a drain, receiving container, or other structure by simply removing drain hose 554 from its storage means, if any, moving shutoff valve 555 to an "open" position, and allowing meltwater to drain from ice bin 552 and out of keg beverage vending module 500. In various embodiments of the invention, drain hose 554 and shutoff valve 555 are constructed and assembled from any suitable tubing and valves which are widely commercially available.

First shelf 517 extends from cooling compartment 550 across line "A" shown in FIG. 27 into tap compartment 511. FIG. 20, FIG. 21, FIG. 22, FIG. 23, FIG. 25, and FIG. 26 show some embodiments of first shelf 527 and its relationship with other elements of the invention. First shelf 527 is coupled transversely between first wall 505 and partition 512. Standard hardware, such as brackets and screws or other fasteners for example, which is known to those skilled in the art and widely commercially available is used to mound first shelf 527. In some embodiments, first shelf 527 is fixed in positions. In other embodiments, first shelf 527 is rests upon a bracket and is removable for cleaning. The position of first shelf 527 traversing between the cooling compartment 550 and the tap compartment 511 allows the operator to re-stock first shelf 527 with beverage cups or other items through the supply side door 590 and to access the cups or other items through the server side door 580 for vending or distribution to customers. In some embodiments, first shelf 527 is positioned such that first shelf 527 inclines from the cooling compartment 550 end to the tap compartment 511 end. In embodiments with this inclined-first shelf 527 configuration, gravity aids movement of items resting on first shelf 527, such as nested plastic beverage cups, from cooling compartment 550 toward tap compartment 511 end, replenishing the items as they are removed. This design allows the operator to dispense the keg beverage from the tap compartment via the driver's side of the utility vehicle 110 without repeatedly walking around to the passenger side of utility vehicle 110.

Server side 510 is divided into tap compartment 511 and storage compartment 520 as shown in FIG. 22 and FIG. 27.

Figure 21:
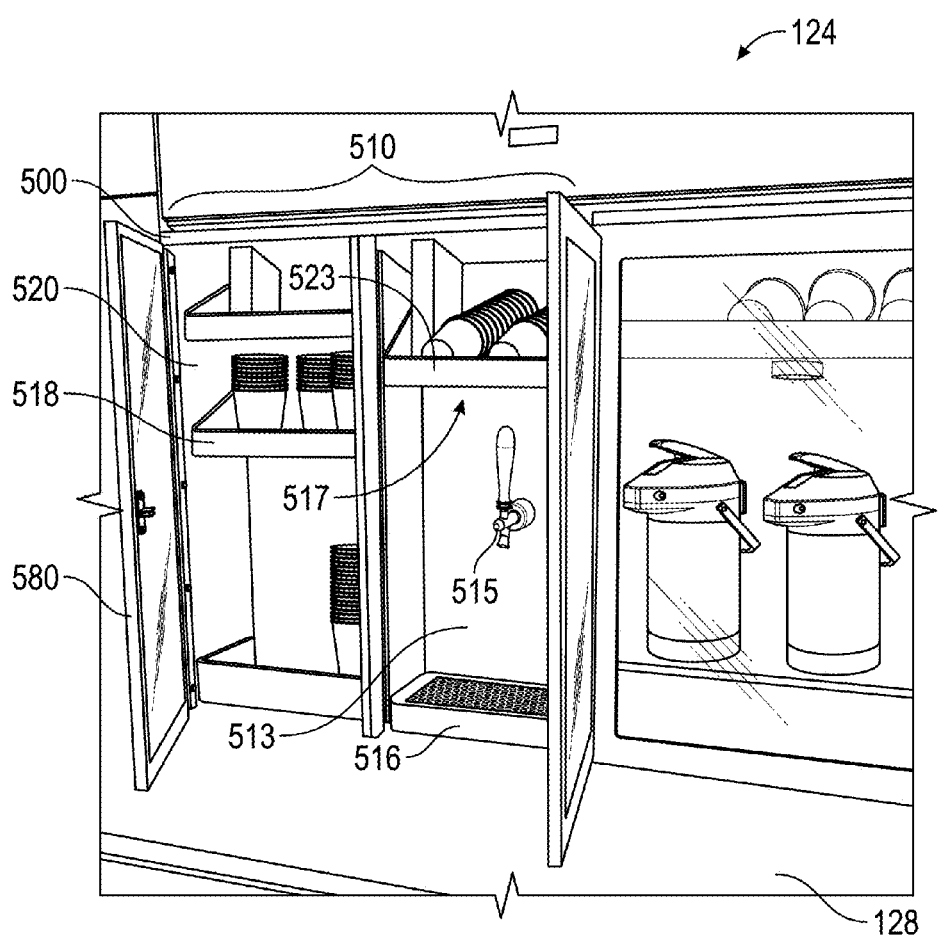
FIG. 21 is a side perspective view of keg beverage concession module 500 installed in the vending service unit body 120 with two server side doors 580 open.

Tap compartment 511, as shown in FIG. 21, FIG. 22, and FIG. 27, is bounded by floor 504, ceiling 503, partition 512, a first wall 505, fascia 513, and server side door 580. Tap compartment 511 contains fascia opening 514, spigot 515, first shelf 517, and drip tray 516. By opening server side door 580 to access tap compartment 511, the operator of keg beverage vending module 500 serves the cooled keg beverage, usually beer or wine, to the customer or guest from spigot 515. Spigot 515 is any commercially available device for dispensing beer, wine, or other keg beverage into a glass, cup, or other receptacle. Spigot 515 traverses between tap compartment 511 and cooling compartment 550 through fascia opening 514. Additionally, spigot 515 is mounted to fascia opening 514. Cooled keg beverage exiting chilled tubing side 571 enters the cooling compartment 550 portion of spigot 515, as previously described.

Fascia 513 bounds the rear of tap compartment 511 where it is directly visible to the vendee. Fascia 513 extends upward from floor 504 and is coupled between first wall 505 and partition 512. In some embodiments, fascia extends upwards to a surface of first shelf 517; in other embodiments not utilizing first shelf 517, fascia 513 extends upwards to ceiling 503. Fascia 513 functions to appeal to the customer and promote the operator's keg beverage and other products. Accordingly, it is desirable for some embodiments of the invention to utilize a decorative finish for fascia 513. Some examples of a decorative finish used in some embodiments are brushed or polished stainless steel. In other embodiments of the invention, fascia 513 provides a surface for displaying promotional material, like print advertising. These are merely examples; embodiments may employ any surface finish, whether decorate or standard, for fascia 513.

FIG. 21, FIG. 22, and FIG. 25 also show drip tray 516. Drip tray 516 catches keg beverage which drips from spigot 515 or is spilled when dispensed and retains the keg beverage for disposal at a later time, when convenient for the operator. Drip tray 516 may be made from any material. Examples include but are not limited to decorative stainless steel, aluminum, other metal, synthetic plastic, or other suitable material. In some embodiments, drip tray 516 is a generally box-shaped structure, which rests on floor 504, extends a length between first wall 505 and partition 512, and is freely removable. In some embodiments, drip tray 516 has a fenestrated top to support a cup, glass, or receptacle into which the keg beverage is dispensed while allowing dripped or spilled keg beverage, including beer foam which overflows the cup or other receptacle, to pass through the fenestrations into the body of the tray where the liquid is retained for later disposal. In some embodiments, drip tray 516 further comprises a body and a fenestrated top, the fenestrated top being removably coupled to the body.

Storage compartment 520 is shown in FIG. 19, FIG. 21, FIG. 22, FIG. 23, and FIG. 27. As shown in the figures, storage compartment 520 is bounded by floor 504, ceiling 503, a second wall 507, a back wall 521, and partition 512. Storage compartment 520 contains a second shelf 518. Storage compartment 520 is accessed through server side door 580, from the driver's side of the utility vehicle 110. There are many configurations and uses possible for storage compartment 520. In some embodiments of the invention, back wall 521 is fitted with a second shelf 518, additional shelves, racks, hooks or other hangers in various combinations to display items for sale or distribution from the keg beverage vending module 500. Examples of such items include, but are not limited to, chips, candy, other snacks; tobacco products, such as cigars; golf accessories, such as tees, balls, gloves, and other small items; and pharmaceuticals such as Tylenol and aspirin, sunscreen, etc. In some embodiments, supplies such as spare cups may be stored on shelves in storage compartment 520. Additionally, second wall 507 and partition 512 may be fitted with hooks, shelves, or other means of displaying and storing items for sale or spare supplies in other embodiments of the invention.

As shown in the figures, two sets of doors complete the enclosure of keg beverage vending module 500's four compartments. Supply side door 590 encloses the supply side 530 compartments and server side door 580 encloses the server side 510 components.

In embodiments shown in the figures, there are two supply side doors 590, one each to enclose cooling compartment 550 and keg storage compartment 540. Other embodiments (not shown) use only one supply side door 590 to enclose both cooling compartment 550 and keg storage compartment 540. Because the components of cooling compartment 550 and keg storage compartment 540 are generally kept hidden from the customer, many embodiments of the invention may use an opaque supply side door 590, as shown in FIG. 24. This is not meant to be limiting, however; supply side door 590 may also be clear or translucent. In some embodiments (not shown), supply side door 590 is fitted with a locking means to secure supply side door 590 in a closed position.

Similar to supply side door 590, server side door 580 is a set of two doors in the embodiments shown by the figures, one each enclosing tap compartment 511 and storage compartment 520. This is not meant to be limiting, however. In other embodiments, server side door 580 is a single door enclosing both tap compartment 511 and storage compartment 520. Unlike components of supply side 530, components of server side 510 are often meant to be seen by the customer. Therefore, some embodiments utilize a clear panel, like a window for example, in server side door 580 as shown by FIG. 23. This is not meant to be limiting, and other embodiments of the invention use an opaque or translucent server side door 580 (not shown).

Supply side door 590 and server side door 580 may be coupled to first wall 505 and/or second wall 507 by any conventional hinged coupling means. Some embodiments use a full-length steel hinge extending along the entire hinged-door edge, as shown in FIG. 23 and FIG. 24. Use of a full-length hinge provides attachment, which is more durable and more likely to keep supply side door 590 and server side door 580 in proper alignment than two or more smaller hinges spaced as intervals along the hinged-door edge. This is not meant to be limiting, however; various embodiments of the invention incorporate commercially available hardware to hingedly attach supply side door 590 and server side door 580 to first wall 505 and/or second wall 507.

A vending service unit that attaches to a utility vehicle has been described. The vending service unit attaches to any utility vehicle or similar vehicle to transform the vehicle into a utility vehicle with food and retail service features. The keg beverage concession module contained within a vending service module coupled to a utility vehicle provides a means for providing chilled keg-stored beverages, such as beer and wine, and other items for sale on a golf course, or other place where people gather. It is to be understood that the embodiment of the keg beverage concession module according to the invention as shown and described is an example only and that many other embodiments of a keg beverage concession module and a vending service unit and a utility vehicle with food and beverage retail features according to the invention are possible and envisioned.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A mobile food and retail service unit comprising:
   a conveyance; and
   a vending service unit coupled to the conveyance, the vending service unit comprising:
   a vending service unit body;
   a removable concession module, wherein the removable concession module is a keg beverage concession module comprising:
   a floor;
   a server side, the server side comprising:
   a tap compartment comprising:
   a fascia, wherein the fascia extends upward from the floor;

a fascia opening;
a tap spigot, wherein the tap spigot is coupled to the fascia opening;
a storage compartment;
a first partition, wherein the partition extends upward from the floor perpendicular to the fascia, separates the tap compartment from the storage compartment and
a first shelf, wherein the first shelf engages the partition and traverses between the supply side and the server side;
a supply side, wherein the supply side is opposite the server side, the supply side comprising:
a keg storage compartment and
a cooling compartment; and
a pressure bar retaining system, wherein the removable concession module is coupled to the vending service unit body by the pressure bar retaining system.

2. The unit of claim 1, wherein the pressure bar retaining system further comprises:
a module locking bar, wherein the module locking bar couples the concession module to the vending service unit body.

3. The unit of claim 2, wherein pressure bar retaining system further comprises:
a protrusion coupled to the keg beverage concession module; and
a recess coupled to the vending service unit body, wherein the protrusion engages the recess.

4. The unit of claim 2, wherein the module locking bar frictionally couples the concession module to the vending service unit body.

5. The unit of claim 1, wherein the keg storage compartment further comprises:
a keg mounting bracket; and
a cylinder mounting bracket.

6. The unit of claim 1, wherein the tap compartment further comprises a drip tray, and wherein the drip tray engages the floor.

7. The unit of claim 1, wherein the first shelf further comprises:
a first end at the server side; and
a second end at the supply side, wherein the first end is inclined below the second end such that gravity facilitates movement of a removable object resting on the first shelf toward the first end.

8. The unit of claim 1, wherein the cooling compartment further comprises:
a second partition, wherein the second partition extends upward from the floor and separates the cooling compartment from the keg storage compartment;
an ice bin;
a beverage cooling coil, wherein the beverage cooling coil is housed within the ice bin; and
a bin lid, wherein the bin lid engages the ice bin.

9. The unit of claim 8, wherein the cooling compartment further comprises a melt water collection system comprising:
a shutoff valve; and
a drain hose comprising:
a proximal end coupled to the ice bin; and
a distal end coupled to the shutoff valve.

10. The unit of claim 1, wherein the conveyance is a small off road utility vehicle.

11. A mobile food and vending service unit comprising:
a keg beverage concession module comprising:
a server side comprising:
a tap compartment; and
a storage compartment;
a supply side opposite the server side, the supply side comprising:
a keg storage compartment;
a cooling compartment comprising a second partition, wherein the partition extends upward from the floor and separates the cooling compartment from the keg storage compartment.

12. The unit of claim 11, wherein the keg storage compartment further comprises:
a compressed gas cylinder mounting bracket; and
a keg mounting bracket.

13. The unit of claim 11, wherein the tap compartment further comprises:
a floor;
a fascia, wherein the fascia extends upward from the floor;
a fascia opening;
a partition, wherein the partition extends upward from the floor and engages the fascia perpendicularly;
a tap spigot, wherein the tap spigot is coupled to the fascia opening; and
a first shelf, wherein the first shelf engages the partition and traverses between the supply side and the server side, and wherein the first shelf further comprises:
a first end at the server side; and
a second end at the supply side, wherein the first end inclines below the second end such that gravity acts to facilitate movement of a removable object resting on the first shelf toward the first end.

14. The unit of claim 11, wherein the cooling compartment further comprises:
an ice bin;
a beverage cooling coil, wherein the beverage cooling coil is housed within the ice bin; and
a bin lid, wherein the bin lid engages the ice bin.

15. The unit of claim 14, wherein the keg beverage concession module further comprises a surface for display of advertising information.

16. A mobile vending service unit comprising:
a utility vehicle; and
a vending service unit coupled to the utility vehicle, the vending service unit comprising:
a vending service unit body; and
a removable keg beverage concession module coupled to the vending service unit body, comprising:
a partition, wherein the partition extends upward from a floor and separates a tap compartment from a storage compartment and
a first shelf engaging the partition and extending between a supply side and a server side.

17. The unit of claim 16, wherein the unit further comprises:
a first surface with a recess; and
a second surface with a protrusion, wherein the protrusion engages the recess when the removable concession module is coupled to the vending service unit body.

* * * * *